US009299069B2

(12) United States Patent
Felse et al.

(10) Patent No.: US 9,299,069 B2
(45) Date of Patent: Mar. 29, 2016

(54) GRANULAR, USER-ACCESSIBLE PAPER PAYMENT PROCESSING INDICATORS

(71) Applicant: Bank of America Corporation, Charlotte, NC (US)

(72) Inventors: Mark D. Felse, Indian Land, SC (US); Theresa M. Brennan, Jr., Garnet Valley, PA (US); Tessa R. Cooke, Mooresville, NC (US); Lawrence E. Fouts, Asheville, NC (US); David T. Frew, Lexington, KY (US); Dewayne A. Furr, Burleson, TX (US); John B. Hall, Charlotte, NC (US); Michele N. Hanshew, Smyrna, DE (US); Nidhi Pinjani, Bear, DE (US); James K. Benton, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 21 days.

(21) Appl. No.: 13/875,943

(22) Filed: May 2, 2013

(65) Prior Publication Data

US 2014/0330715 A1 Nov. 6, 2014

(51) Int. Cl.
*G06Q 20/10* (2012.01)
*G06Q 20/04* (2012.01)
*G06Q 10/10* (2012.01)

(52) U.S. Cl.
CPC ............ *G06Q 20/108* (2013.01); *G06Q 20/042* (2013.01); *G06Q 10/10* (2013.01)

(58) Field of Classification Search
None
See application file for complete search history.

(56) References Cited

U.S. PATENT DOCUMENTS

| 4,914,710 | A | * | 4/1990 | Ward | G06K 5/00 235/449 |
| 5,265,008 | A | * | 11/1993 | Benton | G06Q 20/04 235/379 |
| 5,532,464 | A | * | 7/1996 | Josephson | G06Q 20/02 235/379 |
| 5,691,524 | A | * | 11/1997 | Josephson | G06Q 20/02 235/375 |
| 5,825,506 | A | * | 10/1998 | Bednar | G06Q 40/02 358/402 |
| 5,870,725 | A | * | 2/1999 | Bellinger | G06Q 20/042 705/44 |

(Continued)

*Primary Examiner* — Gregory Johnson
(74) *Attorney, Agent, or Firm* — Weiss & Arons LLP; Michael A. Springs, Esq.

(57) ABSTRACT

Apparatus for electronically notifying an individual of an incomplete transaction associated with a received correspondence item is provided. The apparatus may include a receiver for receiving a single paper correspondence item associated with a first correspondence. The apparatus may include a processor for deriving a digital image from the paper correspondence item. The processor may be configured to determine, based on the derived digital image, whether the correspondence item is a paper check. In response to the determination of the correspondence item as a paper check, the processor may be further configured to use a real-time notification channel to notify the individual of receipt of the paper check. The notification may be based, at least in part, on the identification of the individual. The processor may be further configured to use the real-time notification channel to present at least one option for identification of an account to which the check should be applied.

15 Claims, 16 Drawing Sheets

(56) References Cited

U.S. PATENT DOCUMENTS

| | | | | |
|---|---|---|---|---|
| 5,895,455 A * | 4/1999 | Bellinger | G06F 3/0481 | 705/35 |
| 6,019,282 A * | 2/2000 | Thompson | G06Q 20/02 | 235/379 |
| 6,021,202 A * | 2/2000 | Anderson | G06F 17/24 | 705/18 |
| 6,985,617 B1 * | 1/2006 | Maloney | G07D 11/0084 | 206/569 |
| 7,363,290 B1 * | 4/2008 | Daniel, Jr. | G06Q 40/00 | 707/673 |
| 7,975,911 B2 * | 7/2011 | Artino | G06Q 20/1085 | 235/379 |
| 8,447,627 B1 * | 5/2013 | Cruise | G06F 19/328 | 705/2 |
| 8,768,836 B1 * | 7/2014 | Acharya | G06Q 20/20 | 235/379 |
| 2001/0018739 A1 * | 8/2001 | Anderson | G06F 17/24 | 713/176 |
| 2002/0143621 A1 * | 10/2002 | Donnelly | G06Q 30/02 | 705/14.36 |
| 2002/0169718 A1 * | 11/2002 | Alsofrom | G06Q 20/102 | 705/40 |
| 2003/0217005 A1 * | 11/2003 | Drummond | G06F 3/023 | 705/43 |
| 2004/0076320 A1 * | 4/2004 | Downs, Jr. | G06K 9/03 | 382/139 |
| 2004/0148235 A1 * | 7/2004 | Craig | G06Q 20/04 | 705/35 |
| 2004/0210476 A1 * | 10/2004 | Blair | G06Q 10/02 | 705/13 |
| 2005/0226487 A1 * | 10/2005 | Maloney | G06K 9/00979 | 382/137 |
| 2006/0039580 A1 * | 2/2006 | Moon | G06T 1/0021 | 382/100 |
| 2006/0133277 A1 * | 6/2006 | Carozza | G06Q 20/042 | 370/235 |
| 2007/0005463 A1 * | 1/2007 | Davis | G06Q 30/04 | 705/34 |
| 2007/0037084 A1 * | 2/2007 | Angra | G03G 9/0835 | 430/109.3 |
| 2007/0067236 A1 * | 3/2007 | Deinhardt | G06Q 20/04 | 705/39 |
| 2007/0282724 A1 * | 12/2007 | Barnes | G06Q 40/00 | 705/35 |
| 2008/0033743 A1 * | 2/2008 | Allen | G06Q 10/10 | 705/40 |
| 2008/0086420 A1 * | 4/2008 | Gilder | G06Q 20/04 | 705/44 |
| 2008/0101680 A1 * | 5/2008 | Abernethy | G06K 9/033 | 382/139 |
| 2009/0094148 A1 * | 4/2009 | Gilder | G06Q 20/04 | 705/35 |
| 2009/0109494 A1 * | 4/2009 | Davis | G06K 9/6228 | 358/403 |
| 2010/0082416 A1 * | 4/2010 | Blackman | G06Q 30/0215 | 705/14.17 |
| 2010/0161466 A1 * | 6/2010 | Gilder | G06Q 20/04 | 705/34 |
| 2010/0208976 A2 * | 8/2010 | Abernethy | G06K 9/033 | 382/139 |
| 2010/0223172 A1 * | 9/2010 | Donnelly | G06F 19/328 | 705/34 |
| 2011/0213705 A1 * | 9/2011 | Drummond | G06F 3/023 | 705/43 |
| 2011/0270750 A1 * | 11/2011 | Abrams, Jr. et al. | G06Q 20/04 | 705/41 |
| 2013/0275332 A1 * | 10/2013 | Bennett | G06Q 20/102 | 705/36 R |
| 2014/0214643 A1 * | 7/2014 | Crowe | G06Q 40/02 | 705/35 |
| 2014/0330715 A1 * | 11/2014 | Felse | G06Q 20/108 | 705/42 |

\* cited by examiner

FIG. 5 LEGAL ORDER PROCESSING IMAGE & OCR – PAPER CHANNEL

1002

This tracking update has been requested by:
Name:           'not provided by requestor'
E-mail:         'not provided by requestor'

Our records indicate that the following payment has been made:
Reference:              547831 ———1003
Payment Received:       Dec. 21, 2012 ———1004
Payment Received Time:  12:23 PM ———1006
Service Type:           Credit Card Payment ———1008
Transaction Type:       Mail with Coupon ———1010
Number of pieces:       2 ———1012
Special handling/Services: None ———1014
Tracking Number:        021909562105549 ———1016
Status:                 At Dec. 21 2:30 PM Payment Rec Timely
                        Received, Not Yet Paid ———1018

Mailing Information:    Recipient Information:
Jane Doe                John Doe
Bank A                  123 Main Street
123 Broadway            New York
Los Angeles             NY
CA                      US
US                      10020
12345

⎵———1020              ⎵———1022

11:24 AM EST on 12/22/2012.

FIG. 10

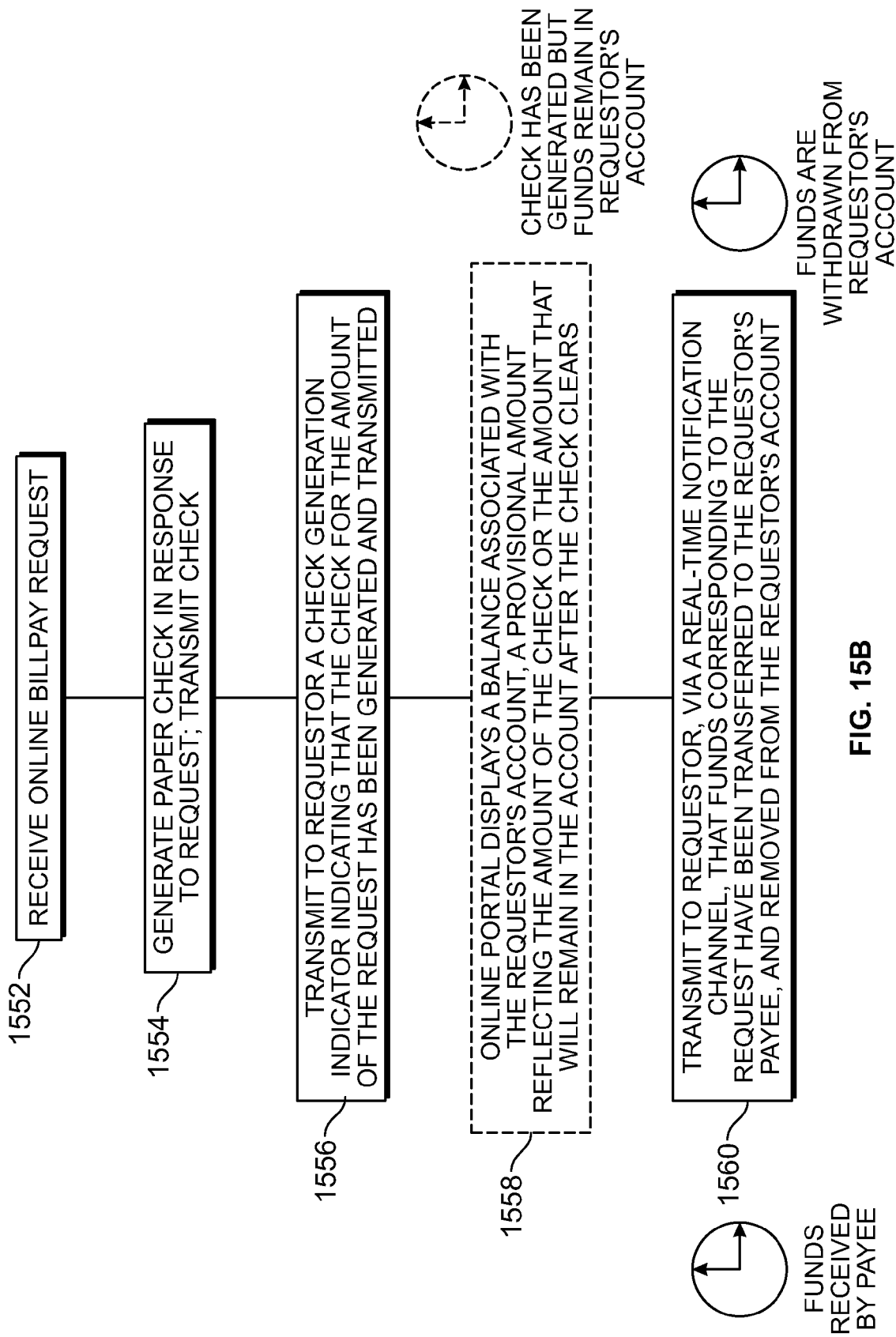

GRANULAR, USER-ACCESSIBLE PAPER PAYMENT PROCESSING INDICATORS

FIELD OF TECHNOLOGY

This invention relates to a tool for use in tracking internal payment processing. Specifically, this invention relates to analyzing paper payment processing within a financial institution and notifying clients regarding same.

BACKGROUND OF THE DISCLOSURE

Financial institutions receive funds as part of various types of financial transactions. For example, a financial institution may receive, at an automated teller machine ("ATM") or a banking center, funds for deposit into a customer's account. A financial institution may receive funds as part of a bank-by-mail process.

A financial institution may receive funds from a commercial customer. A financial institution may receive funds from a non-commercial customer.

Upon receipt of funds for deposit, such funds may be processed for proofing. Proofing, as it applies to printed checks and other similarly printed deposits, typically includes processing checks through an encoding machine that places a magnetic ink character recognition print ("MICR") of the amount, and other missing information that is needed, along the bottom of the check. MICR allows the checks to be batch-processed or read through a machine to direct the funds to the right accounts.

A financial institution may also receive funds as part of a retail payment transaction. For example, a financial institution may receive funds as a payment towards a credit card account. A financial institution may receive funds as a payment towards a debit card account. A financial institution may receive funds as a payment towards a mortgage account. A financial institution may receive funds as a payment towards a home equity loan account.

Funds received by a financial institution as part of a payment transaction may be received via tracked mail—such as funds sent by cash, check or other payment means. Funds received by a financial institution as part of a retail payment transaction may be received through an overnight delivery service. Funds received by a financial institution as part of a retail payment transaction may be received through the United States Postal Service ("USPS"). Funds received by a financial institution as part of a retail payment transaction may be received via courier.

Upon receipt of funds from any of the sources listed above, or from other suitable sources, a financial institution may transfer the funds for proof of receipt and further processing. Following establishment of proof of receipt, a financial institution may correct, or otherwise respond to, any errors in the proofing of receipt.

Following the completion of the proof of receipt, a financial institution may further electronically process the incoming funds—e.g., by electronically processing documents such as checks. Thereafter, the checks and/or other documentation, may be reviewed for conformance with proper standards such as sufficient funds, etc.

The financial institution may prepare statements and exceptions to show a final allocation of the funds.

It should be noted that retail payments to a financial institution may be sorted in either a high speed fashion or a low speed fashion. The determination as to the speed of sorting may be based, at least in part, on the uniformity of the incoming payments. If the payments are relatively more uniform then they may be sorted at a high speed. If the payments are relatively less uniform then they should be sorted at a lower speed. The relatively less uniform payments should be sorted at a lower speed in order to accommodate the higher ratio of exceptional payments.

Certain funds received by a financial institution relate to legal order processing. Such legal orders may include tax levies, child support payments, garnishments or any other suitable processing of legal orders.

It would be desirable for a financial institution to receive all of its incoming funds, whether from deposits, retail payments, legal orders or any other suitable incoming source, through a unified pathway. This is desirable at least because a unified incoming pathway may make more efficient use of resources necessary to process incoming funds. In addition, a unified incoming pathway may make more efficient use of resources necessary to process exceptional payments.

SUMMARY OF THE DISCLOSURE

Systems and methods for electronically notifying an individual of a received correspondence item are provided. The system may receive a paper correspondence item. The system may derive a digital image from the correspondence item. The system may identify, based on the derived digital image, whether the correspondence item is classified as one of a deposit, a payment or a legal order processing document, and may identify, based on the derived digital image of the correspondence item, an individual associated with the correspondence item. The system may, in response to the classification of the correspondence item, route the correspondence item to a sub-entity of the financial institution. The sub-entity may be associated with a classification associated with the correspondence item. The system may use a real-time notification channel to notify the individual of receipt of the correspondence item based, at least in part, on the identification of the individual and on a communication protocol associated with the sub-entity. The real-time notification channel may be a user-defined or system-set notification channel.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 10 shows an exemplary tracking status update report for a paper payment;

DETAILED DESCRIPTION OF THE DISCLOSURE

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art upon reading the following disclosure, unified incoming communication pathway processing may be embodied as a method, a data processing system, or a computer program product. Accordingly, unified incoming communication pathway processing may take the form of an entirely hardware embodiment, an entirely software embodiment or an embodiment combining software and hardware aspects.

Furthermore, unified incoming communication pathway processing may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In an exemplary embodiment, in the event that unified incoming communication pathway processing is embodied at least partially in hardware, the unified incoming communication pathway processing may include one or more databases, receivers, transmitters, processors, modules including hardware and/or any other suitable hardware. Furthermore, the operations executed by unified incoming communication pathway processing may be performed by the one or more databases, receivers, transmitters, processors and/or modules including hardware.

Figure 1:
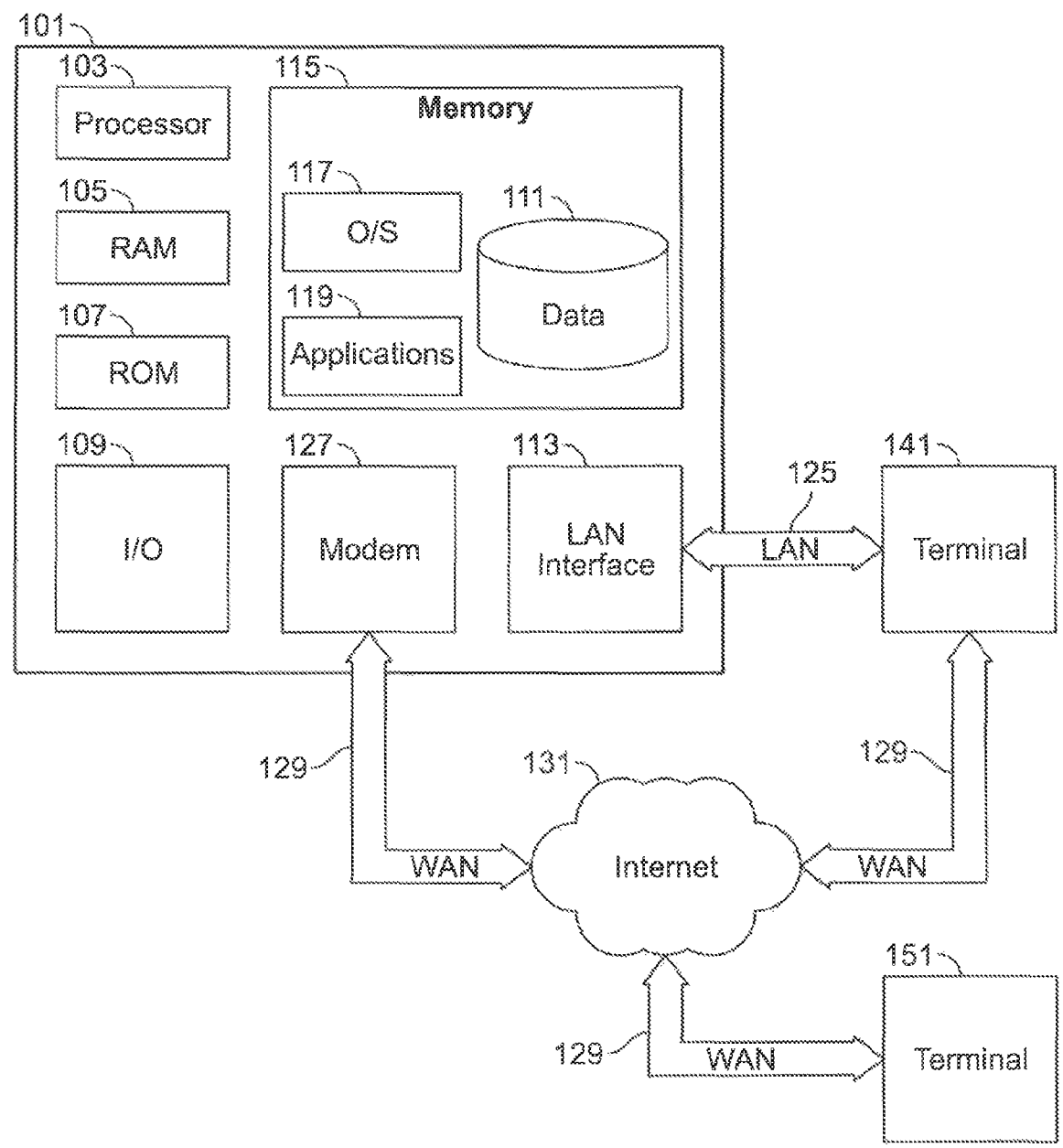
FIG. 1 shows apparatus that may be used in accordance with the systems and methods of the invention.

FIG. 1 is a block diagram that illustrates a generic computing device 101 (alternately referred to herein as a "server") that may be used according to an illustrative embodiment of the invention. The computer server 101 may have a processor 103 for controlling overall operation of the server and its associated components, including RAM 105, ROM 107, input/output module ("I/O") 109, and memory 115.

I/O module 109 may include a microphone, keypad, touch screen, and/or stylus through which a user of server 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternately, some or all of server 101 computer executable instructions may be embodied in hardware or firmware (not shown). As described in detail below, database 111 may provide storage for information input into to implement unified incoming communication pathway processing.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network ("LAN") 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages via the World Wide Web from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by a user of unified incoming communication pathway processing to access and input information into the claim rate calculator. Information input for use with unified incoming communication pathway processing may be stored in memory 115. The input information may be processed by an application such as one of applications 119.

Figure 2A:
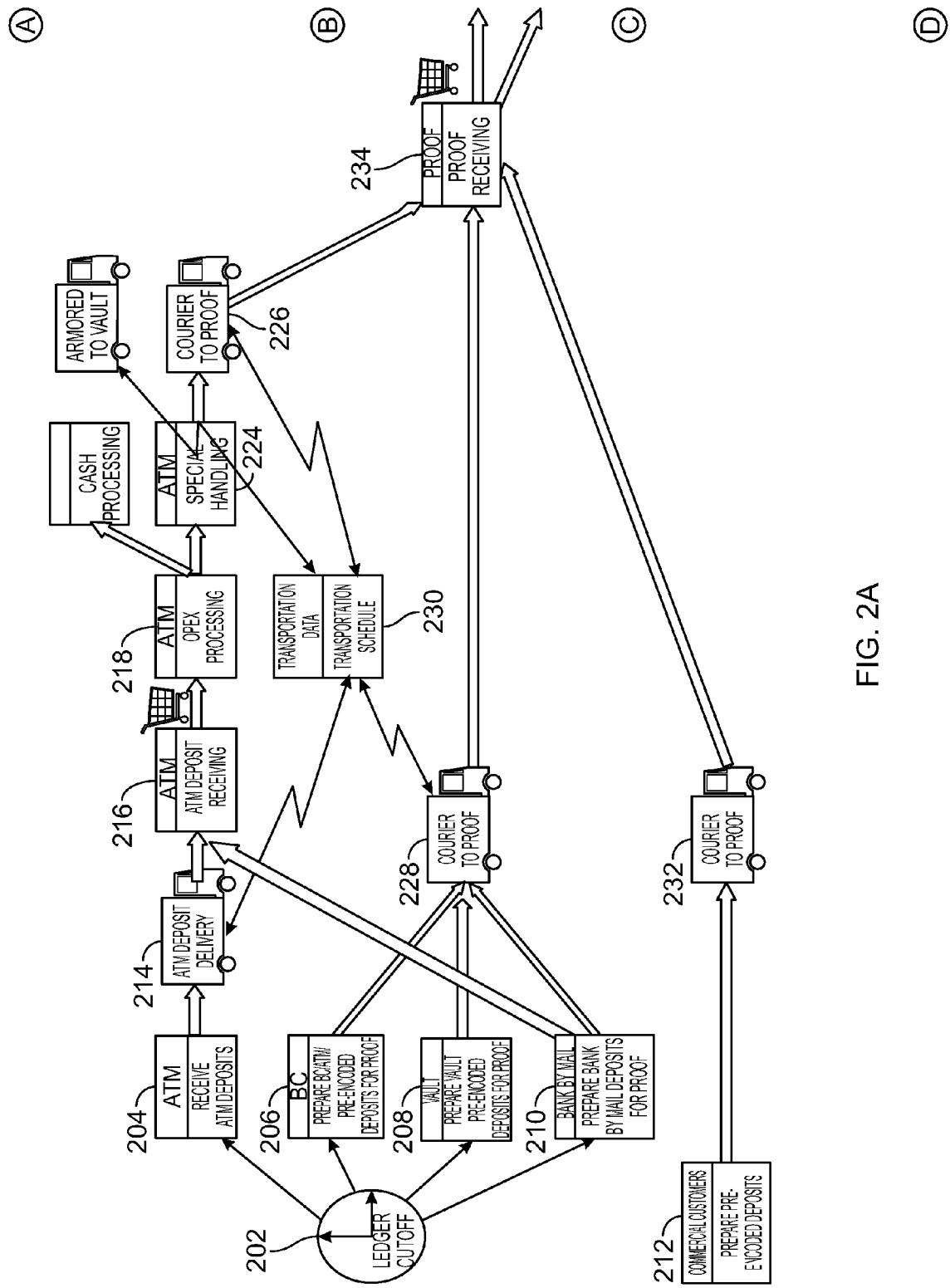
FIGS. 2A-2C show an illustrative flow diagram of a process that may be used in accordance with the systems and methods of the embodiments.
Figure 2B:
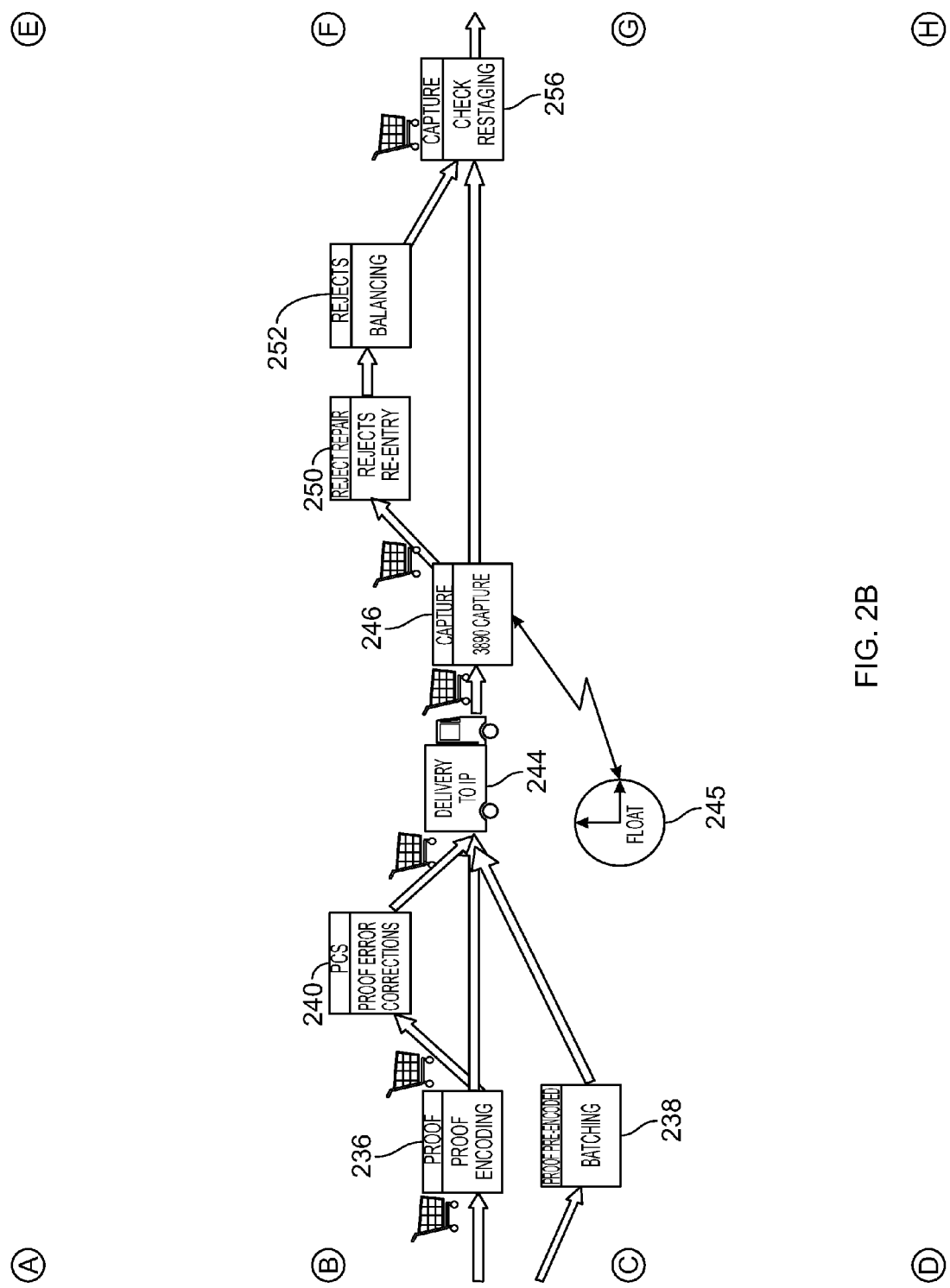
Figure 2C:
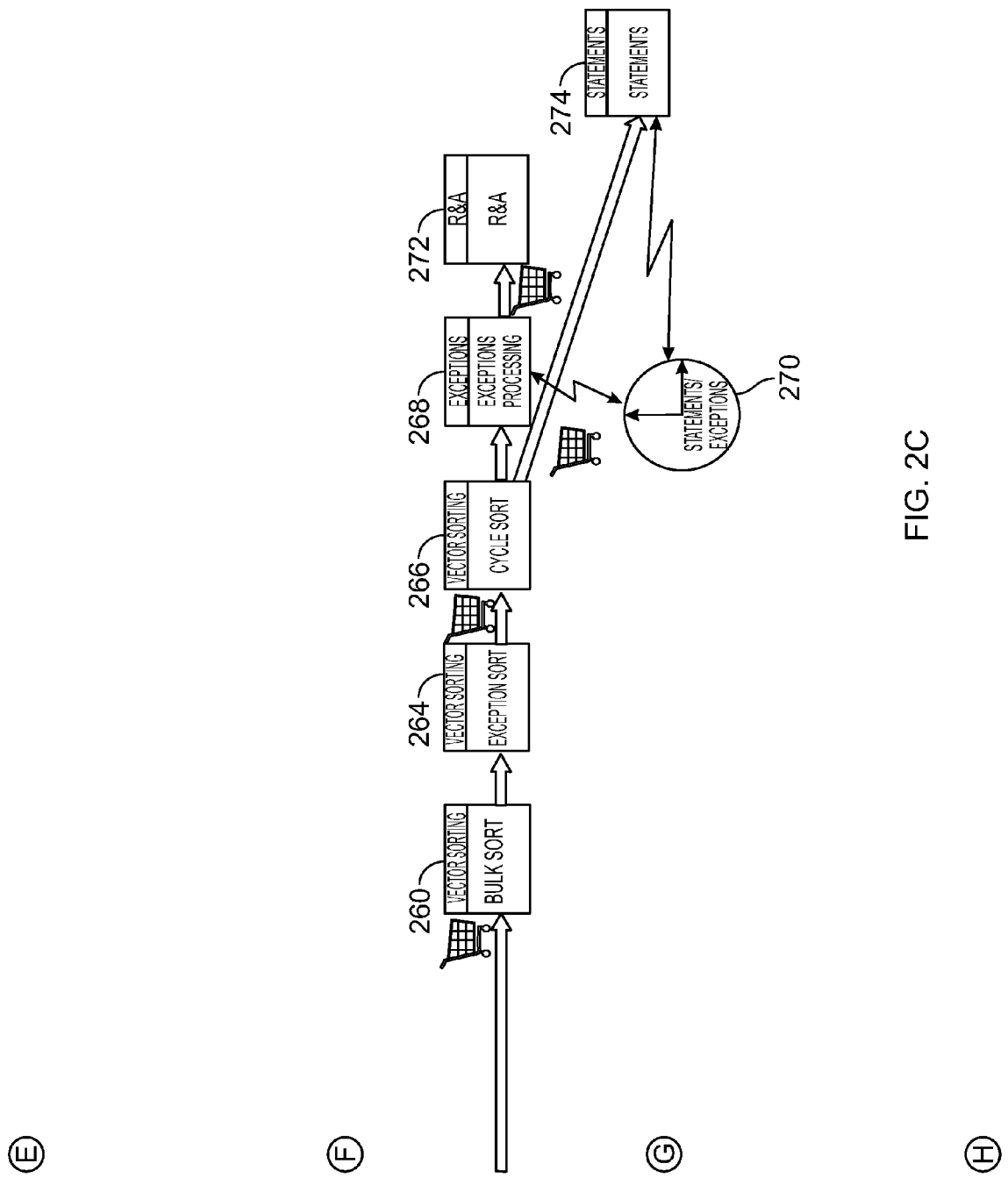

FIGS. 2A-2C show an illustrative flow diagram of a process that may be used in accordance with the systems and methods of the embodiments.

FIG. 2A shows the beginning of the process that may be used in accordance with the systems and methods of the embodiments. Ledger cutoff 202 indicates the time of arrival for any of ATM deposits 204, banking center ("BC") deposits 206, pre-encoded vault deposits 208 and bank by mail deposits 210. BC deposits 206, pre-encoded vault deposits 208 and bank by mail deposits 210 may be prepared for proofing. Commercial customers may prepare pre-encoded deposits at 212 which may follow an independent path 232 to proof and join the other lines of deposit at 234.

ATM delivery 214 may be physically transferred to ATM deposit receiving 216 that is then transferred for OPEX processing 218. OPEX processing 218 may involve processing envelopes and the contents therein. OPEX processing may include ATM cash processing 218, which is transferred to a vault at 222 and ATM special handling processing 224, which is couriered 226 to proof 234.

FIG. 2B shows that, following proofing 234, the process may include encoding the deposits. The process may include correcting the errors at proofing step 240. The deposits may delivered from step 236 or step 240 to internal processing ("IP") and then to mail capture at 244. Float 245—i.e., an actual transfer of the funds from the payee to payor—may be triggered by mail capture 246.

Mail capture 246 may then be followed by rejected check repair 250. Rejected check repair 250 may lead to balancing at 252 and to check restaging 256.

For the purposes of this application, check staging (which proceeds restaging), may be understood to refer to the act of taking the deposits out of whatever container they are received in (bag, envelope, etc.), removing paper clips or staples that may prevent the machines from processing the items correctly, inserting required control documents to create a control point for the continued processing, and putting the deposits and any accompanying control documents in the correct order for processing through the capture step.

"Re-staging" is done (either physically or electronically) to put a rejected, but corrected, deposit back into its logical location after the capture step but prior to any additional processing.

The portion of FIG. 2B that corresponds to elements 244 and 246 may be understood as follows. This portion of the flow diagram describes the capture of the paper deposits/checks on a processing machine such as the IBM 3890 ("3890"). At the 3890, the paper deposits/checks are converted to image. Float clock 245 is used to show that from this point the financial institution ascertains what type of items it has received, and generates float calculations based on the time it will take to settle the item with the drawing for checks.

Following check restaging 256, FIG. 2C shows bulk sorting 260. Bulk sorting 260 may be followed by exception sorting 264, cycle sorting 266, exception processing 268 and R & A 272. Statements/exceptions may be recorded at 270 and statements finally printed at 274.

Figure 3:
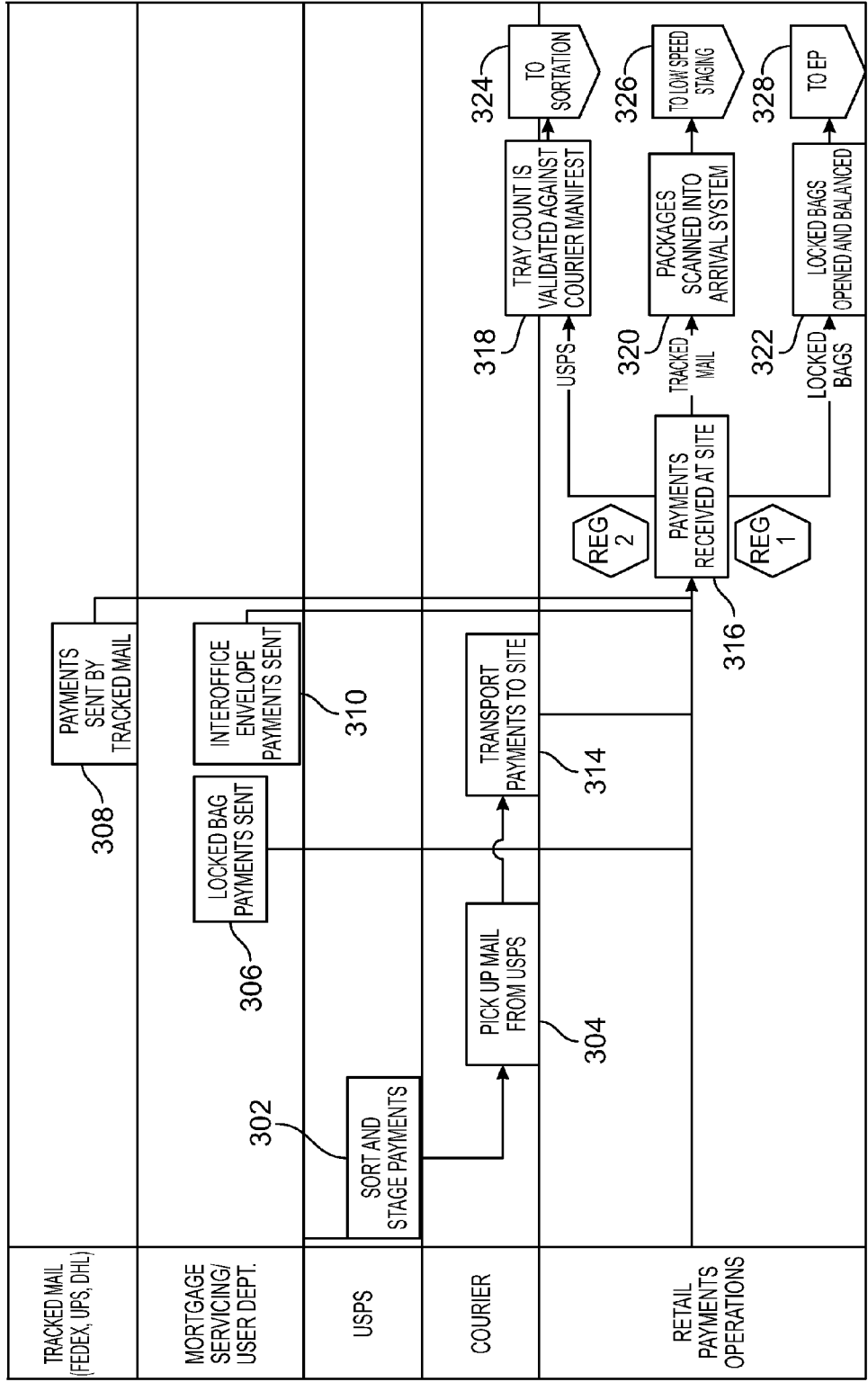
FIG. 3 shows an illustrative flow diagram of another process that may be used in accordance with the systems and methods of the embodiments.

FIG. 3 shows processing of retail payments to a financial institution. Retail payments may be sorted and staged by the USPS, 302. Payments sorted and staged by the USPS, at step 302, may be picked up by courier 304 and transported to a selected site at 314.

Retail payments may also be sent via locked bag payments 306, tracked mail 308, interoffice envelope payments 310 or any other suitable form of transmission.

Payments sent by tracked mail 308 as well as mortgage payments 306, 310 and other correspondence items may be received at a selected site at 316.

Typically, the USPS payments received at the selected site are validated against a courier manifest at 318 and transferred to sort, 324. Payments received by tracked mail are scanned into an arrival system at 320 and transferred to low speed staging, 326. Locked bags are opened and balanced at 322 and sent to "Exception Processing" ("EP"), 328. The locked bags are opened and reconciled (balanced) to the bag manifest so that all correspondence items are accounted for before the payment envelopes are sent to EP. At EP, they are manually reviewed to determine what action needs to be taken on the item.

It should be noted that Regulation Z is invoked by the process shown in FIG. 3. Regulation Z relates to timely posting of payments, correspondence items received at site and start of process. It should be noted further that Regulation AB is also invoked by the process shown in FIG. 3. Regulation AB relates to transparency/timely positing of payments, correspondence items received at the site and start of process.

Figure 4:
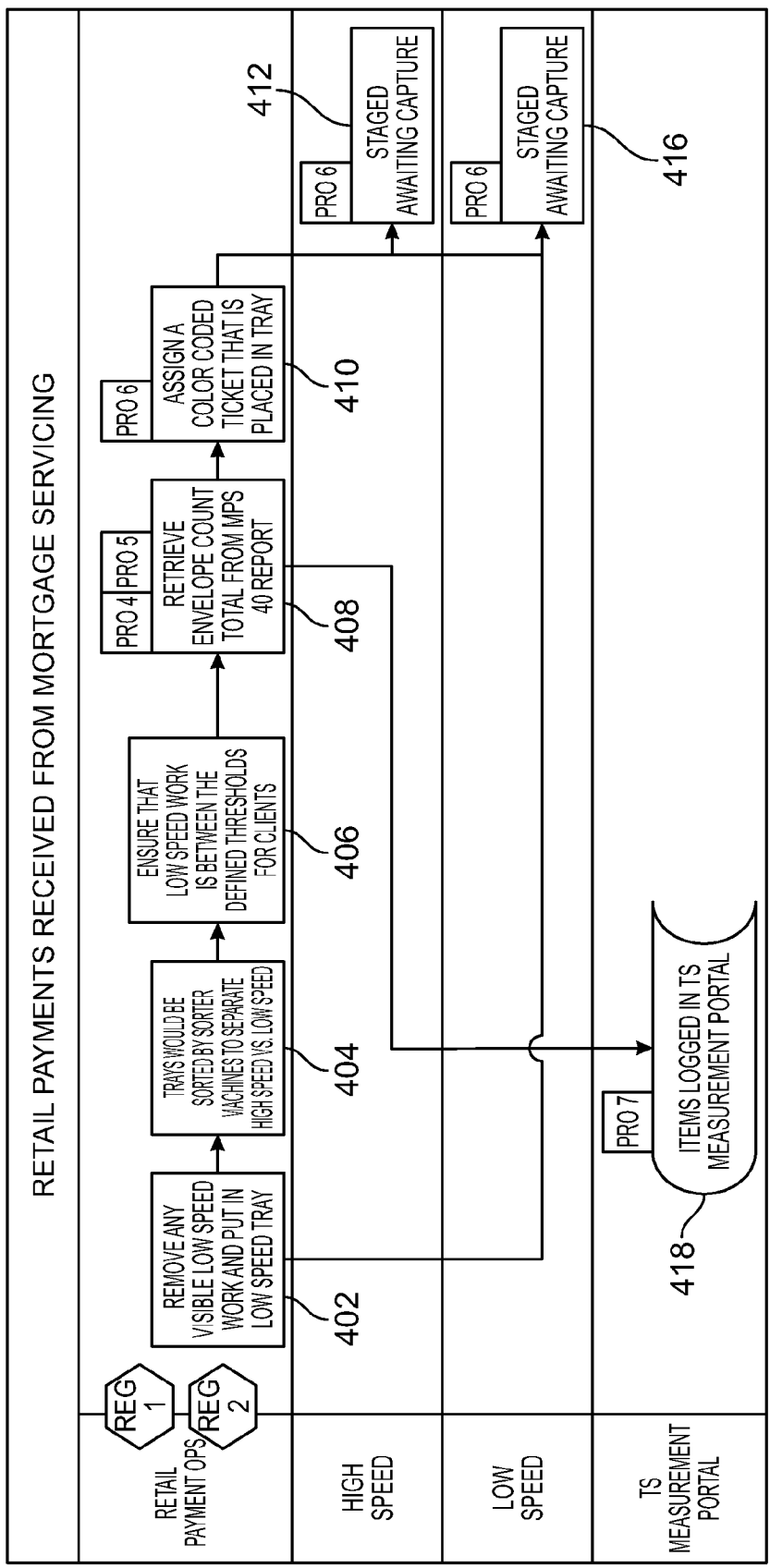
FIG. 4 shows an illustrative flow diagram of yet another process that may be used in accordance with the systems and methods of the embodiments.

FIG. 4 shows an illustrative flow diagram of processing of retail payments following receipt of the payments. Such processing may involve sorting (324 shown in FIG. 3), low speed staging (326) and/or EP (328). This portion of the flow represents the receipt of the locked bags from mortgage servicing shown at 316 in FIG. 3.

Any visible low speed correspondence items may be removed at 402 and put in a low speed tray. Trays may be sorted by sorter machines, at 404, to separate high speed sortable payments and low speed sortable payments. At 406, systems and methods may preferably ensure that a level of low speed correspondence items is between defined thresholds for clients.

An envelope count total may be retrieved from a mail room sorter, such as the MPS 40 manufactured by OPEX. The envelope count total may form a portion of the MPS 40 report at 408 (a report relating to envelope count, sorted mail pieces and other related information, that may be retrieved from a known mailroom sorter). A color coded ticket may be assigned at 410. The high speed sorted mail may be staged awaiting capture at 412 and the low speed sorted mail, removed at step 402, may be staged awaiting capture at 416.

Following retrieval of the envelope count total from the MPS 40 report, items are preferably logged in a TS measurement portal, 418. TS measurement portal 418 is a data collection system used to compare mail processed through preferably all mail processing steps and to ensure that, at the end of the day, the input count and the output count for the entire process are equal. In the embodiments described herein, TS measurement portal 418 preferably compares volume of envelopes processed at the first step to volume of envelopes processed in the last step.

Figure 5:
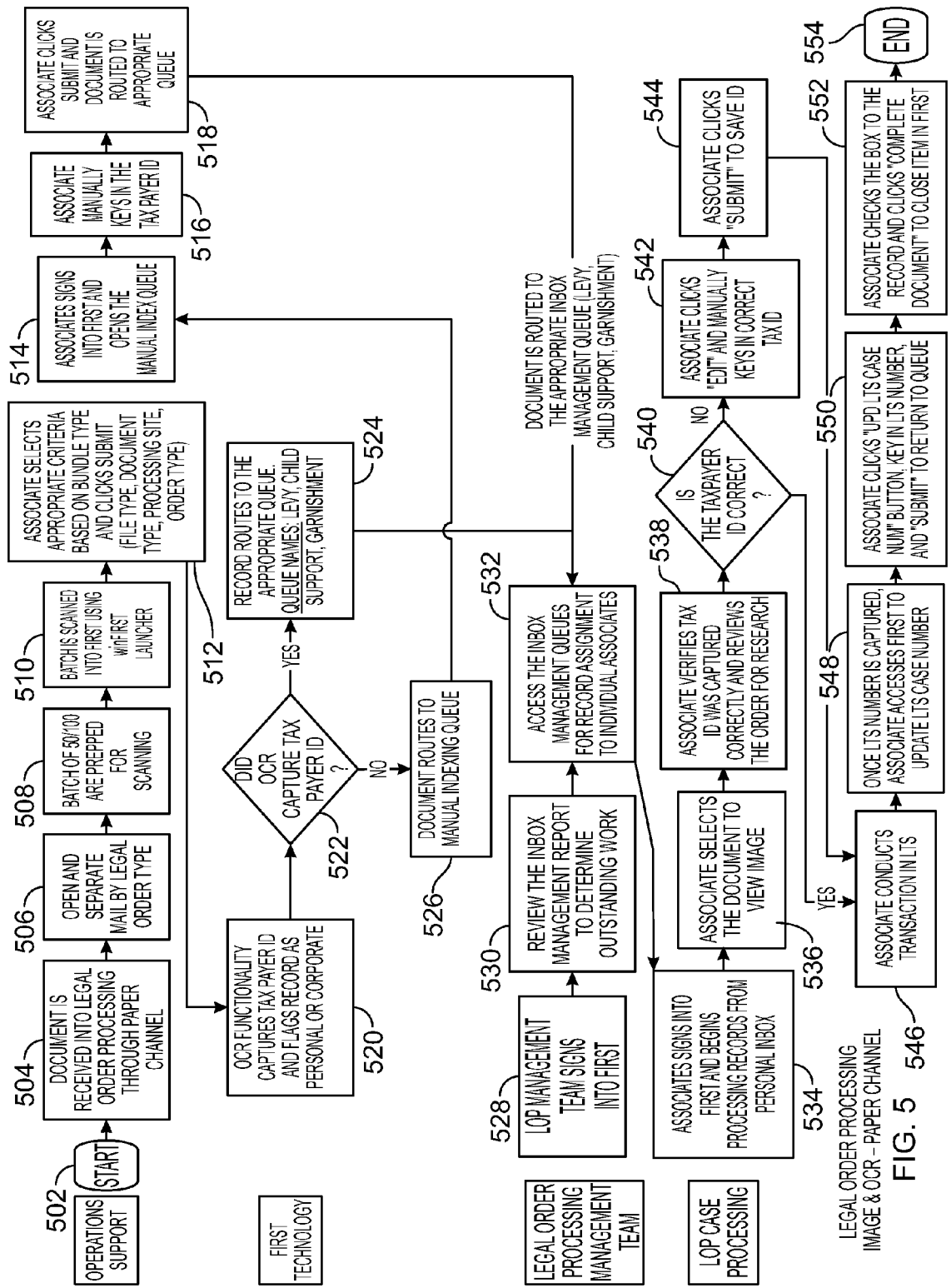
FIG. 5 shows an illustrative flow diagram of still another process that may be used in accordance with the systems and methods of the embodiments.

FIG. 5 shows an illustrative flow diagram of legal order processing ("LOP")—image and optical character recognition—paper channel. The process may start at 502. Correspondence items may be received into LOP through a paper channel at 504. These times, which may include mail, may be opened and separated by legal order type at 506. Batches of 50 to 100 pieces of mail may be prepared for scanning at 508. A batch may be scanned into a winFIRST launcher, as shown at 510. A winFIRST launcher is the capture platform that is used for capturing the LOP requests.

An associate may select appropriate criteria based on bundle type and then click submit to submit the selected criteria, as shown in 512. The submitted criteria may include file type, document type, processing site and order type.

FIRST technology may implement OCR functionality in order to capture tax payer ID and electronically mark, or, alternatively, electronically flag, the record as either personal or corporate, as shown at 520. The system may query, at 522, whether the system successfully captured the tax payer ID. If it did successfully capture the taxpayer ID, then the record may be routed at 524 to the appropriate queue. The queue names may include levy, child support, garnishment, etc.

If the system did not successfully capture the taxpayer ID, the system may send the document for routing to the manual indexing queue, as shown at 526. An associate may then sign in to FIRST, open the manual indexing queue at 514, manually key in the tax payer ID at 516 and, at step 518, submit the document for routing to the appropriate queue.

Whether following step 518 or step 524, the inbox management queues may be accessed for record assignment to individual associates at 532.

An alternative path to record assignment, 532, may be initiated by the LOP management team. In such an occurrence, the LOP management team may sign into FIRST, 528, review the inbox management report to determine outstanding correspondence items at 530, and then access the inbox management queues to assign the correspondence items as necessary at 532.

After assignments to individual associates at 532, an LOP record may be processed by an associate processing the record at 534. Processing may include selecting the document to view images at 536, verifying the tax payer ID capture at 538 and querying, at step 540, whether the tax payer ID is correct.

If the tax payer ID is determined to be correct, then the associate may conduct the transaction in LTS, as shown at 546. If the tax payer ID is determined to be incorrect, then the associate may choose, at step 542, to edit and manually key in a correct tax payer ID. Thereafter, the tax payer ID may be saved at 544 and the system may return the document to step 546.

Once the LTS number is captured, an associate can access FIRST to update the LTS case number, as shown at 548, submit the LTS number at 550, check the box to the record and complete the document in the first system to close at 552. Thereafter, the process ends at 554.

Figure 6:
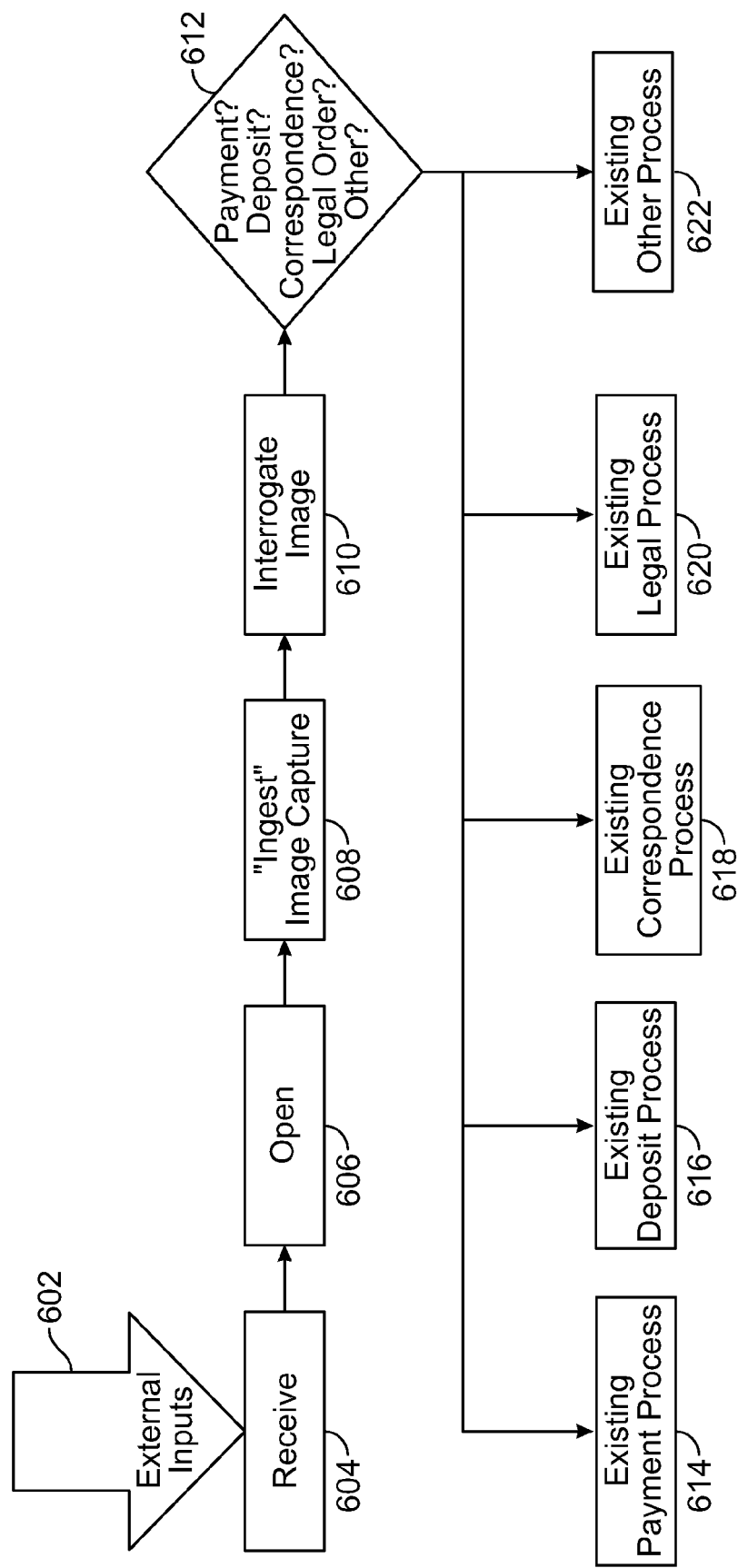
FIG. 6 shows an illustrative flow diagram of another process that may be used in accordance with the systems and methods of the embodiments.

FIG. 6 shows a high-level, illustrative, flow diagram of a process according to the invention. The process preferably illustrates unified incoming communication pathway processing for a financial institution.

External inputs, such as paper correspondence items, are transmitted at step 602 and received at step 604.

Such external inputs may include one or more of inputs 204-212 (ATM Deposits, banking center inputs, pre-encoded vault inputs, bank by mail inputs or commercial, pre-encoded deposit input) shown in FIG. 2A; inputs 302, 306 and 308 (USPS transmitted payments, locked bag payments or payments sent by tracked mail) shown in FIG. 3; input 504 (work received through LOP) shown in FIG. 5; and of any other suitable input.

These inputs may be opened at step 606. Ingest image capture occurs at 608, with image interrogation occurring at step 610. Step 608 may, for example, correspond to step 234 (proofing receiving) and/or 246 (capture) shown in FIG. 2A. Step 610 may form a pre-cursor to query 612, which queries whether the incoming input is a retail payment (or other payment), deposit, correspondence item, legal order or other input. Thus, the image interrogation may provide sufficient information to determine whether the input is a retail payment (or other payment), deposit, correspondence item, legal order or other input.

In response to determining the answer to the query at 612, the system may route the input to the existing payment process 614 (including retail payment processes, mortgage payment processes, wholesale lockbox operations (for corporate to corporate payments), government lockbox operations, or any other suitable payment processes—it should be noted that such payment processes may be routed to a more granular aspect of the payment process downstream (not shown) of the processing shown in FIG. 6), the existing deposit process 616, the existing correspondence item process 618, the existing legal process 620 or any other existing process (inclusive of, for example, processing of non-payment customer correspondence, etc.). Thus, embodiments of the present invention may use steps, such as exemplary steps 602-612, to form a part of unified incoming communication pathway processing according to the invention.

In certain embodiments of the invention, upon receipt of paper payment from a customer, the system may query whether a real-time notification channel should be used for contacting the customer. Following a receipt to the query that a real-time notification should be used to contact the customer, the system may query which real-time notification channel may be used to contact the customer.

Such a channel may be customer-selected. Such a channel may be system set. Such a channel may have a default, but may, in certain circumstances, allow for user definition. It should be noted that, while this application refers to real-time notification channels, this is only a preferred embodiment and notification through slower than real-time notification channels—e.g., an e-mail that runs in a periodic batch mode—are also within the scope of this application.

Following determination of the real-time notification channel to be used for contacting the customer, the system may contact the customer using the channel to inform the customer of receipt of paper payment or other paper correspondence.

Such a real-time notification channel may be used for contacting the customer upon deposits received from exemplary inputs 204-212 (ATM Deposits, banking center inputs, pre-encoded vault inputs, bank by mail inputs or commercial, pre-encoded deposit input) before, during or after image interrogation 610 and/or before, during or after query 612 shown in FIG. 6.

Figure 7:
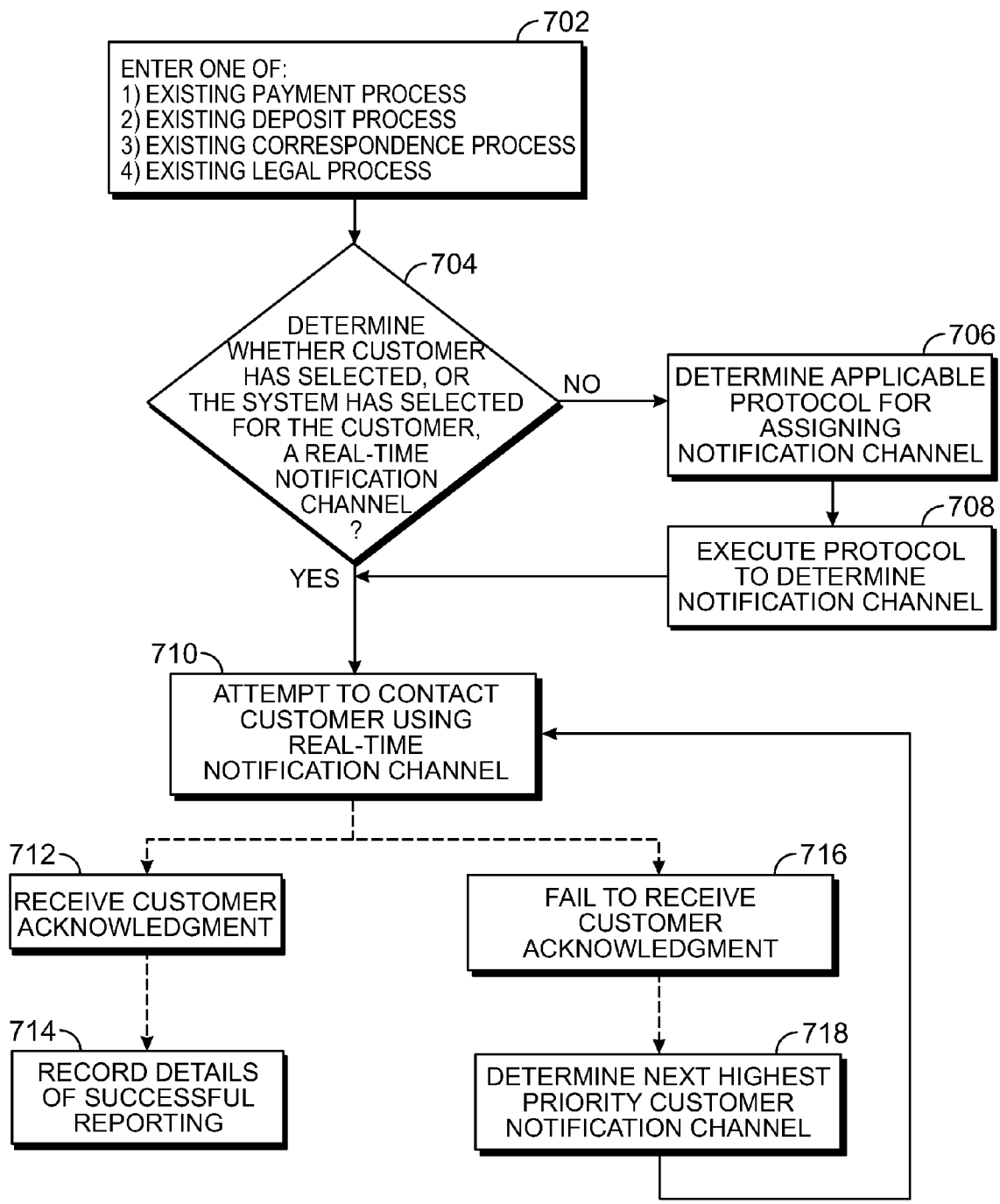
FIG. 7 shows an illustrative flow diagram of a process for supporting a real-time notification channel associated with receipt of a paper payment.

FIG. 7 shows an illustrative flow diagram of a process for supporting a real-time notification channel associated with receipt of a paper payment or other paper correspondence. Specifically, FIG. 7 shows one embodiment of an algorithm for selecting, or receiving a selection, of a real-time notification channel.

FIG. 7 also shows using the selected real-time notification channel for contacting a customer.

Step 702 shows entering one of the existing processes shown in FIG. 6 as steps 614 through 620. Step 704 shows querying whether the customer has already been assigned a real-time notification channel.

If the customer has selected a real-time notification channel or the system has already designated a real-time notification channel for the customer, step 710 shows using the real-time notification channel to contact the customer. If the customer has not yet selected a real-time notification channel, or been designated a real-time notification channel, step 706 shows using a protocol associated with the applicable process, entered into at step 702, to select a notification channel.

It should be noted that each of the processes shown at 702, as well as any other suitable process, may preferably maintain individual protocols for selecting a real-time notification channel, as well as for any other aspect of receiving and processing correspondence items.

Examples of real-time protocols may include the following. Deposits may involve a ledger cutoff, as shown at step 202 of FIG. 2A. Other protocols may or may not employ such a cutoff. In cases where the timed cutoff is not used, the protocols may just involve an end of the day cutoff for payments.

Step 708 shows executing protocols to determine a notification channel. Such protocols may involve querying a lookup table for information relating to the customer associated with the payment.

Such protocols may involve reviewing the payment history of the customer and implementing a protocol that is variable based on the history of the individual. For example, if a customer has historically timely paid outstanding obligations, the protocol may provide the customer with an extra grace period for making a payment towards an outstanding obligation. It should be noted that each of the processes shown at 614-620 may support unique protocols.

The processing time and steps that correspond to processing deposits may be different from the processing time and steps associated with processing retail payments. Specifically, allocation of overpayment of a credit card bill is governed by the Credit Card Act of 2010. This Act requires that overpayments are applied to the outstanding balance, from among the various balances on the credit card, having the highest annual percentage rate ("APR"). Examples of balances which appear on a credit card statement include, for example, purchase debt, balance transfer debt, cash advance debt, etc.

Following execution of the protocol in step 708, the process may attempt to contact the customer using the selected channel, as shown in 710.

In certain embodiments, the customer may be prompted to confirm receipt of the notification, and pursuant to the prompt, the protocol may be configured to receive confirmation of receipt, as shown in step 712. Then, the process may further record details of the successful reporting, as shown at step 714.

If the system fails to receive customer acknowledgment, as shown at step 716, then the system may determine the next highest priority customer notification channel, as shown at step 718.

The ranking of the notification channel for contacting the customer may be set according to a specific protocol. The ranking of the notification channel for contacting the customer may, in certain embodiments, not be process dependent.

It should be noted that the customer may have designated, or have been designated, more than one type of real-time notification channel, as shown in Table 1 (below). In certain embodiments, the customer may also designate an order by which he would like to be notified.

TABLE 1

Exemplary Real-Time Notification Channels

| Exemplary Real-Time Notification Channel | Most Recently Assigned Priority Level |
|---|---|
| First e-mail address | 1 |
| Second e-mail address | 2 |
| Text message Number | 3 |
| Mobile Phone Number | 4 |

In certain embodiments, the customer may request e-mail notification as a first channel. If, however, the customer does not acknowledge receipt of the e-mail within a predetermined time period, then the customer may instruct the financial institution to try to contact him on his mobile phone. If the customer does not acknowledge contact via the mobile phone, then the customer may have already designated a second phone number by which he can be reached, etc.

In some embodiments, the systems and processes may send an updated payment status indicator to the customer in response to a change of payment status or other suitable trigger. In certain embodiments, the customer may be updated periodically with payment status indicators. In certain embodiments, the customer may select one or more status indicators from among a group of status indicators, and only be updated regarding the selected group of status indicators. In other embodiments, the system may determine the status indicators to which the user responds most rapidly, and continue in the future only to update the user regarding the highest ranking status indicators.

In certain embodiments of the invention, the system may provide a learning algorithm to determine which real-time notification channel is the most effective for reaching the customer. For example, the system may continuously review the ten, or other suitable number, of most recent acknowledged customer notifications. Such a moving window of periodically reviewed acknowledged customer notifications may provide the basis of an ongoing review.

Based on the review, the system may preferably, continuously, or periodically, update the primary channel by which the customer is contacted. The system may also update the ranking of the non-primary notification channels following failure to contact the customer via the first channel.

For example, the system may determine based on the responses to the last ten (or some other suitable, preferably pre-determined, number) customer notifications and/or attempted notifications that, although text messaging is not listed first, the customer is most easily contacted using by text message. In response to the determination of the most successful notification channel, the system may change the ranking of channels by which to notify the customer of a received payment.

An equation for periodically updating the priority level of the real-time notification channel is shown below.

$$\text{MAX}|_M(\Sigma_{n=-10}^{0} C_M)$$   Equation 1:

M=a notification channel
C=the number of times, taken over n=−10 to n=0 for each notification channel, that the notification channel received a confirmation from the customer.

Equation 1 preferably determines, based on data corresponding to the confirmations received from the customer over the last ten notification attempts, the notification channel that obtained the greatest amount of confirmations from the customer over the last ten real-time notifications.

In certain embodiments, the elapsed time between each attempt at contacting the customer may also be based, at least in part, on a customer's historic behavior. For example, as part of the ongoing monitoring for customer's confirmations, the systems and/or processes may also monitor how quickly the customer confirmed receipt of the notification. In addition, the systems and/or processes may monitor what times of day, if any, provided relatively quicker, or slower, confirmation times.

Figure 8:
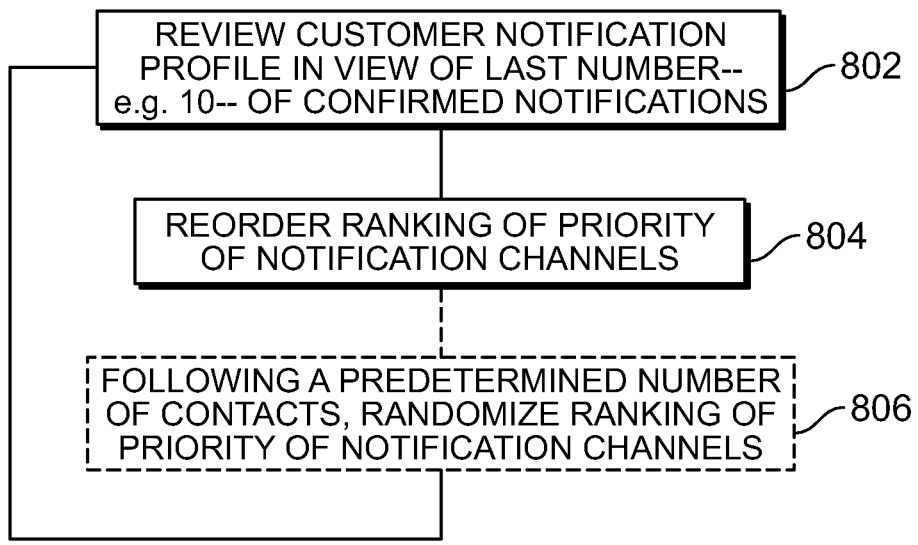
FIG. 8 shows an illustrative flow diagram of a process for updating selection of a real-time notification channel associated with receipt of a paper payment.

FIG. 8 shows an illustrative flow diagram of a process for updating selection of a real-time notification channel associated with receipt of a paper payment. Specifically, FIG. 8 shows, at step 802, reviewing customer notification profile in view of the last number of confirmed notifications. Such a number, which may be predetermined, may provide the window described above for substantially continuously, or periodically, reordering the list of ranked notification channels, shown at 804.

It should be noted that a customer's notification profile should also be subject to customer-determined conditions.

For example, a customer may specifically request that contacts be sent through one notification channel and not sent through a different notification channel. Thus, a customer's profile may specify that the financial institution contact the customer through his first provided e-mail address, and further specify that the financial institution not contact him through his mobile number. Accordingly, for such a customer profile, the mobile number may be considered "off limits" for the financial institution.

Another feature of the invention relates to customer segment "randomization." Systems and methods according to the invention preferably include the ability to periodically "randomize" a customer's notification channel profile. For the purposes of this application, non-dynamic randomization may be defined as periodically changing, modifying or adjusting, in some suitable fashion, a customer's notification channel profile. Dynamic randomization is explained in more detail below. Such randomization, either dynamic or non-dynamic, may preferably be implemented to ensure the ongoing designation of the customer's notification channel profile is correct and is current with the respect to the customer's preferences. Such a method may be important at least because a particular customer's preference may change with respect to time.

For example, certain embodiments of the invention may include contacting the customer first using e-mail, then text messaging, then a mobile phone call. Then, after a predetermined number of contacts, the system may randomly switch the order such that the first contact is a mobile phone call, followed by text messaging and then e-mail. Then, the system may monitor and determine the respective success of the randomization. In one embodiment of the invention, if the system determines that the randomization achieved a predetermined level of success, for example by achieving a predetermined threshold of successful acknowledged contacts, the system may preferably shift the customer's default profile to the new profile.

Step 806 shows that, following a predetermined number of times in which the process ranks the channels, the process may randomize ranking of priority of notification channels at least in order to ensure that the current customer's ranking matches his most recent preferences.

In some embodiments of the invention, the system may preferably periodically query the customer to determine whether his notification profile has changed—e.g., has customer's primary e-mail address changed? has customer's mobile phone number changed? has customer's preference for notification channel changed? etc.

Another aspect of the invention relates to tracking and monitoring the movement of funds associated with customer transactions. Preferably, systems and methods track and monitor the funds as the funds move through the financial institution to their designated location. Such tracking and monitoring preferably provides highly granular payment status determination. Table 2 shows a list of exemplary status identifiers:

TABLE 2

Exemplary Status Identifiers

| Exemplary Status Identifiers | Exemplary Descriptors in Specification |
| --- | --- |
| Payment received | See FIGS. 2A-C, elements 202-210 |
| Timely received | See FIGS. 2A-C, elements 202-210, 246 |
| Timely paid | See FIGS. 2A-C, elements 202-210 |
| Amount paid | See FIG. 10 |

TABLE 2-continued

Exemplary Status Identifiers

Figure 15A:
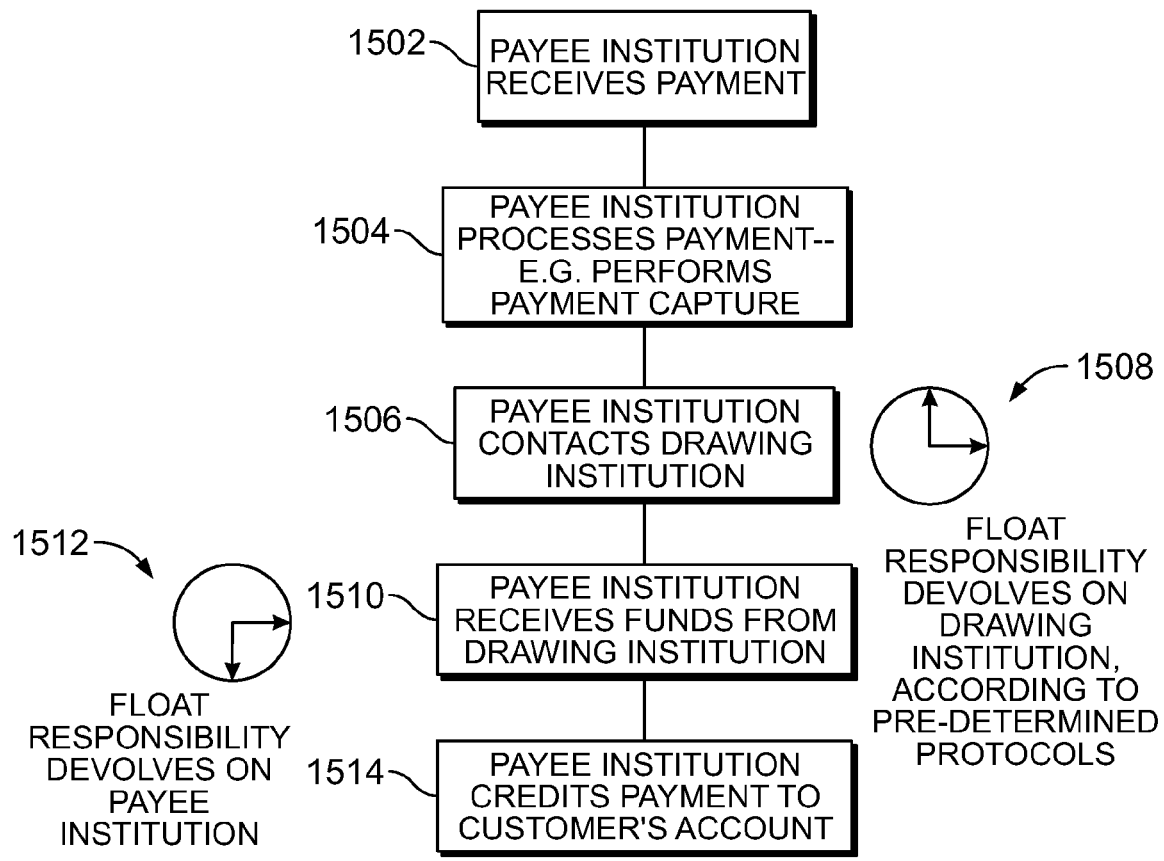
FIGS. 15A and B show an illustrative flow diagrams of processes associated with determining float obligations attendant to processing of customer payments.

| Exemplary Status Identifiers | Exemplary Descriptors in Specification |
| --- | --- |
| Payment received | See, FIGS. 2A-C, element 246, See FIGS. 15A and 15B |
| Funds received from payee institution | See FIGS. 15A and 15B |
| Funds credited to customer account | See FIGS. 15A and 15B |

A status identifier such as timely received may be associated with a step such as steps 204, 206, 208 and 210 provided as confirmed by the ledger cutoff 202; steps 302, 306, 308 or 310 as confirmed by payment received step 316; step 504 and steps 604-608.

Exemplary status identifiers such as "payment received" (which may indicate receipt of payment, prior to comparison with outstanding payment obligation), "timely received" (which may indicate receipt of payment prior to determination of sufficiency of payment), "timely paid" (which may indicate determination of sufficiency of payment, but possibly prior to decision regarding overpayment of funds) or "amount paid" (which may indicate results of allocation pursuant to decision regarding overpayment of funds and/or or other suitable information) may be associated with a step such as step 246, which is associated with the float clock 245 shown in FIG. 2. Thus, once step 246, for example, has been executed, the any of the appropriate status identifiers may be associated with the payment.

In certain embodiments, the status indicator "timely received" may correspond to a comparison of a ledger cutoff time to the due date for the payment. In some embodiments, the status indicator "timely paid" may be based on a comparison of the digital image capture of the correspondence item to the due date for the payment. In certain embodiments of the invention, when the payment check is rejected by a drawing institution for reasons such as failure by the customer to maintain a sufficient sum at the drawing institution, a status identifier such as "failed payment," or other suitable status identifier may be transmitted to the customer. In such circumstances, the responsibility to cure the failed payment, as well as to pay an fees pursuant to the failure, may devolve upon the customer preferably upon receipt, and confirmation of the failed payment status identifier.

In certain embodiments of the invention, a tracking number may be provided to the customer so that payment can be confirmed and tracked. The reference number may be accompanied by additional information to facilitate tracking of the payment by the customer. In embodiments in which the customer can request information from the financial institution, the customer may navigate to an appropriate web portal, enter the reference number, and obtain detailed information regarding the processing of the customer's payment. For example, the customer could enter the tracking number and determine whether the payment was timely received, timely paid, or any other identifiable status.

Figure 9:
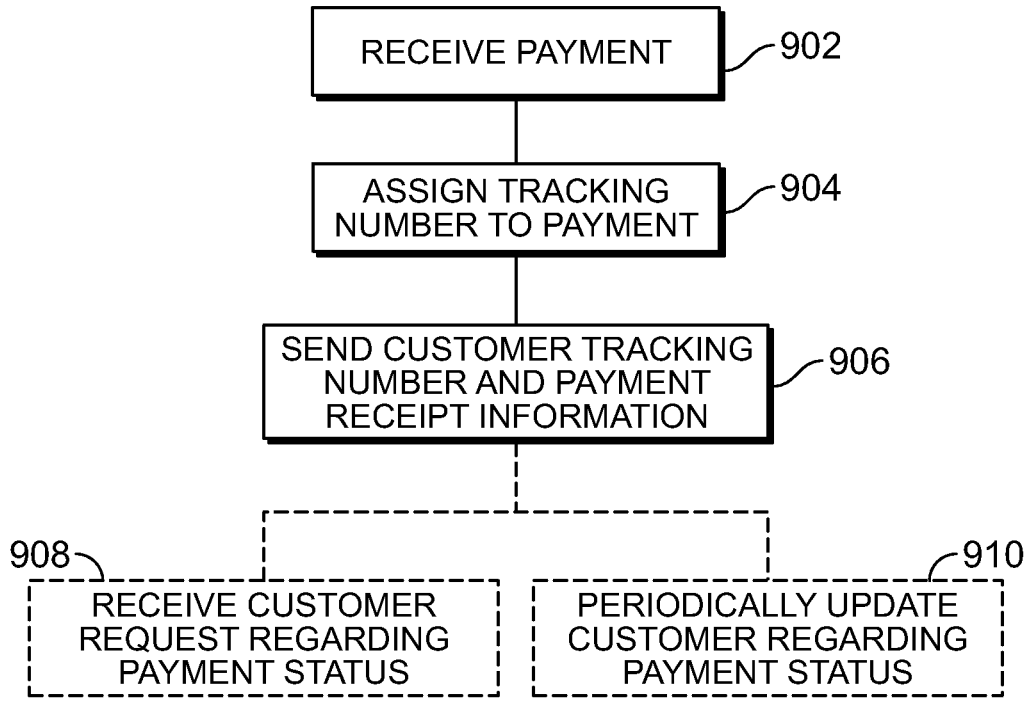
FIG. 9 shows an illustrative flow diagram for supporting tracking of a paper payment.

FIG. 9 shows an illustrative flow diagram for supporting tracking of a paper payment. FIG. 9 shows receiving payment at 902. Step 904 shows assigning a tracking number to the payment for future identification. Step 906 shows sending the customer tracking number and payment receipt information to the customer. Step 908 shows receiving a customer request regarding payment status and step 910 shows periodically updating the customer regarding payment status.

FIG. 10 shows an embodiment of an exemplary tracking status update form 1002. Form 1002 includes entries for a payment reference number 1003, a payment received date 1004, a payment received time 1006, a service type 1008, a transaction type 1010, number of pieces in the envelope 1012, special handling 1014, a payment tracking number 1016, a payment status descriptor 1018, mailing information 1020 and recipient information 1022.

Aspects of the invention may also relate to failed, or potentially failing, transactions. In certain embodiments of the invention, the real-time notification channel may allow for acceleration of remediation of failed transactions. For example, certain transactions may be identifiable as failed transactions or may be identifiable as having a high tendency to fail.

Checks without signatures, underpayment of outstanding obligations or overpayment of outstanding obligations may be classified either as failed transactions, transactions with a high tendency to fail or otherwise irregular transactions. As such, systems and methods according to the invention may preferably use the embodiments relating to the real-time notification channel as set forth herein in order to alert the customer.

In one particular embodiment, the financial institution may notify the customer of receipt of an unsigned check by sending to the customer images of one or both sides of the unsigned check in an image format, such as in a TIFF file or in a PDF file. Together with the transmission of images of the unsigned check, the financial institution may send instructions to print and sign the face of the unsigned check and return it to the financial institution by electronic transmission or by paper transmission.

Timely notifying the customer of the failed, or possibly failing, transaction may, in some circumstances, shift the burden for rectifying the failed transaction to the customer. Such a shifted burden may preferably motivate the customer to take immediate steps to correct the failed transaction by, for example, signing a print out of the transmitted check image, making a replacement payment, or contacting the financial institution to provide additional information.

Figure 11:
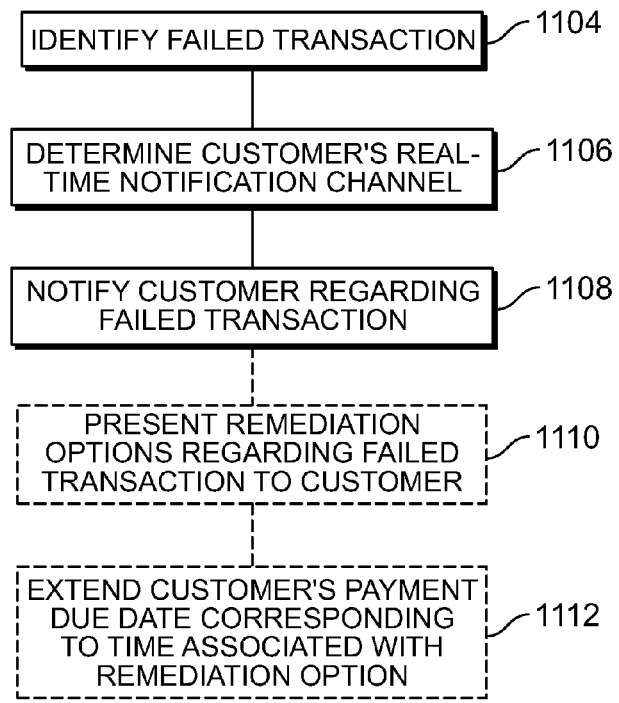
FIG. 11 shows an illustrative flow diagram of a process associated with identifying a failed transaction.

FIG. 11 shows an illustrative process for identifying failed or potentially failing transactions. Step 1104 shows identifying failed or potentially failing transactions. Step 1106 shows determining a customer's real-time notification channel. Step 1108 shows notifying the customer regarding the failed transaction. Step 1110 an optional step of presenting remedial options regarding the failed transaction to the customer. Step 1112 shows yet another optional step of extending a customer's payment due date corresponding to time associated with the processing of the failed transaction and/or some other suitable time period.

Figure 12:
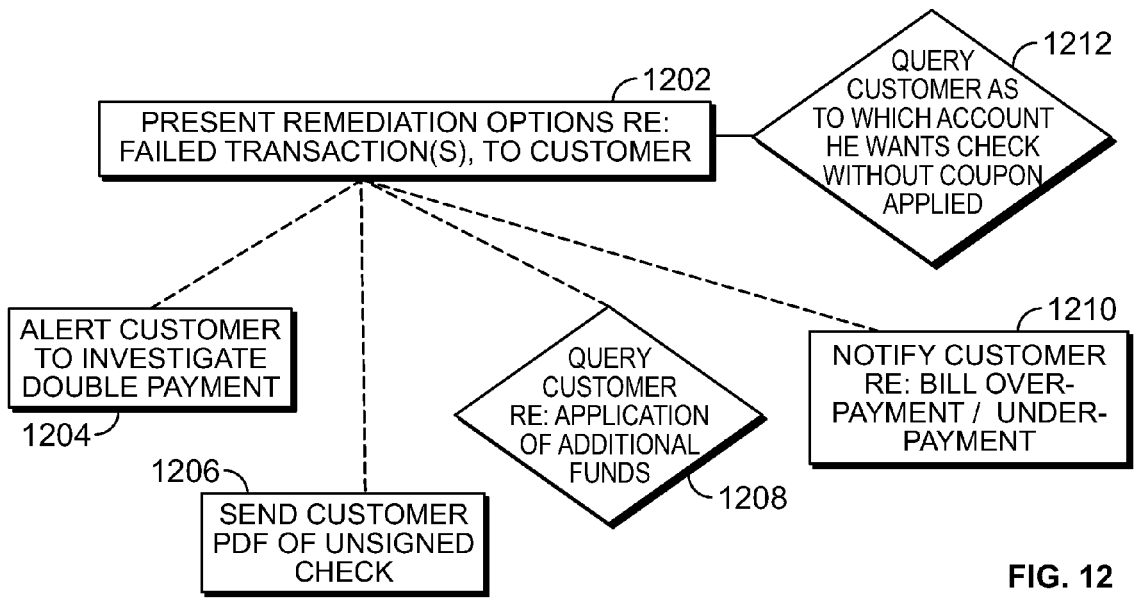
FIG. 12 shows an illustrative flow diagram of a process associated with remediating a failed transaction.

FIG. 12 shows an illustrative process for presenting remediation options regarding the failed transaction to the customer, as indicated at step 1202. Such options may include alerting the customer to investigate double payment, 1204. Such options may include sending a customer a pdf file of a received, but unsigned, check, 1206. Such options may include querying the customer regarding application of additional funds, 1208. Such options may include notifying the customer regarding overpayment and/or underpayment of an outstanding bill, 1210.

Such options may also include notifying the customer regarding receipt of a check without a coupon 1212. In such an embodiment, the customer may be queried as to which account and/or obligation he or she wants the check to be applied to. Thus, if the customer holds a credit card account and a mortgage account at the bank, the notification may query the customer as to which of the credit card account and the mortgage account the customer wants the payment applied. Such a remediation option is preferably only exemplary of any customer decision point that may be referred to a customer in order to remediate failed payment activity. It should be noted that, with regards to embodiments in which a check is received absent any other identifying information, the decision process regarding mediation may preferably be implemented at (or as part of) step 612 of FIG. 6.

A check that is received absent any other identifying information may not be routable to any known process because its destination is not easily identifiable. Some embodiments may include performing a method for electronically notifying an individual of an incomplete transaction associated with a received correspondence item.

Such an incomplete transaction may include receiving just a paper check in the mail absent of, or independent of, any accompanying correspondence item such as a payment coupon. Such a method may further include receiving, by a receiver, only a single paper correspondence item associated with a first correspondence. Some embodiment may also include deriving, by a processor, a digital image from the paper correspondence item. The method may further include using the processor to determine, based on the derived digital image, whether the correspondence item is a paper check. In response to the determination of the classification of the correspondence item as a paper check, the embodiments may include using the processor to route the digital image of the paper check to a sub-entity of a financial institution. The sub-entity may be associated with the paper check. The method may further include using a real-time notification channel to notify the individual of receipt of the paper check. The method may obtain the information based, at least in part, on the identification of the individual and on a communication protocol associated with the sub-entity. The method may also include using the real-time notification channel to notify the individual of the receipt of the paper check and present at least one option for identification of an account to which the check should be applied. The notification may be based, at least in part, on the identification of the individual and the communication protocol associated with the sub-entity of the financial institution.

In certain embodiments, the paper check itself may fail to identify an account number. Certain embodiments may include presenting a plurality of accounts to the user for account selection in response to the notification of failure to include a payment coupon. Some embodiments may include using the processor to present a field to the user for inputting an account selection in response to the notification.

Another aspect of the invention relates to analyzing payments and/or brokerage orders. Such analysis may be based on determining the identity of the bank that the payment was drawn on. Such analysis may preferably obtain information regarding the customer's financial profile. For example, if a customer paid with a certain type of payment instrument, such as a branded credit card, the identification associated with the payment instrument may indicate the location and/or availability of funds associated with the customer.

Certain branded credit cards require substantial deposits at a predetermined institution. In such instances, the financial institution that receives payment from a customer that is drawn on the branded credit card may electronically notify the group responsible for marketing within the financial institution, or some other appropriate sub-entity within the financial institution, regarding the payment and the identity of the payee. The notification may indicate to the appropriate sub-entity that the customer has substantial deposits at other financial institutions. Such information may be valuable for any number of purposes including, but not limited to, marketing, asset identification, etc.

Figure 13:
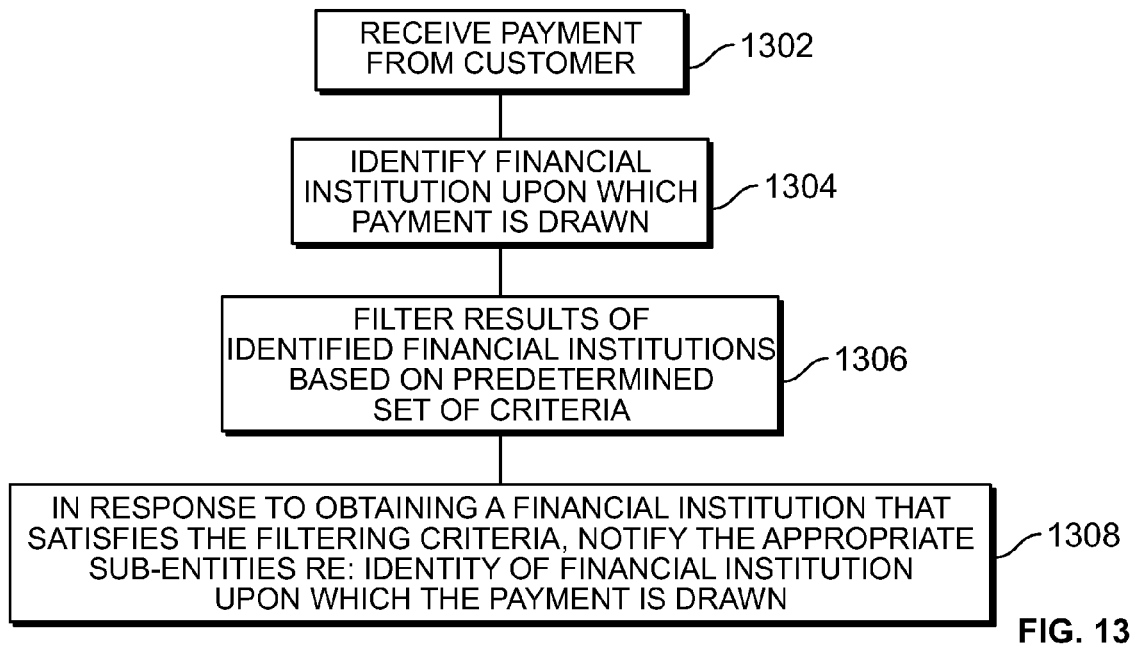
FIG. 13 shows an illustrative flow diagram of a process associated with identifying a financial institution upon which a payment is drawn.

FIG. 13 shows an illustrative flow diagram of a process associated with identifying a financial institution upon which a payment is drawn. Step 1302 shows receiving a payment from a customer. Step 1304 shows identifying the financial institution upon which payment is drawn. Step 1306 shows filtering the results of the identified financial institutions. The filtering is preferably implemented based on a predetermined set of criteria.

In response to satisfying the filtering criteria of step 1306, step 1308 shows electronically transmitting to selected sub-entities within the receiving financial institution the identity of the financial institution upon which a payment has been drawn, and which satisfies the filtering criteria.

Figure 14:
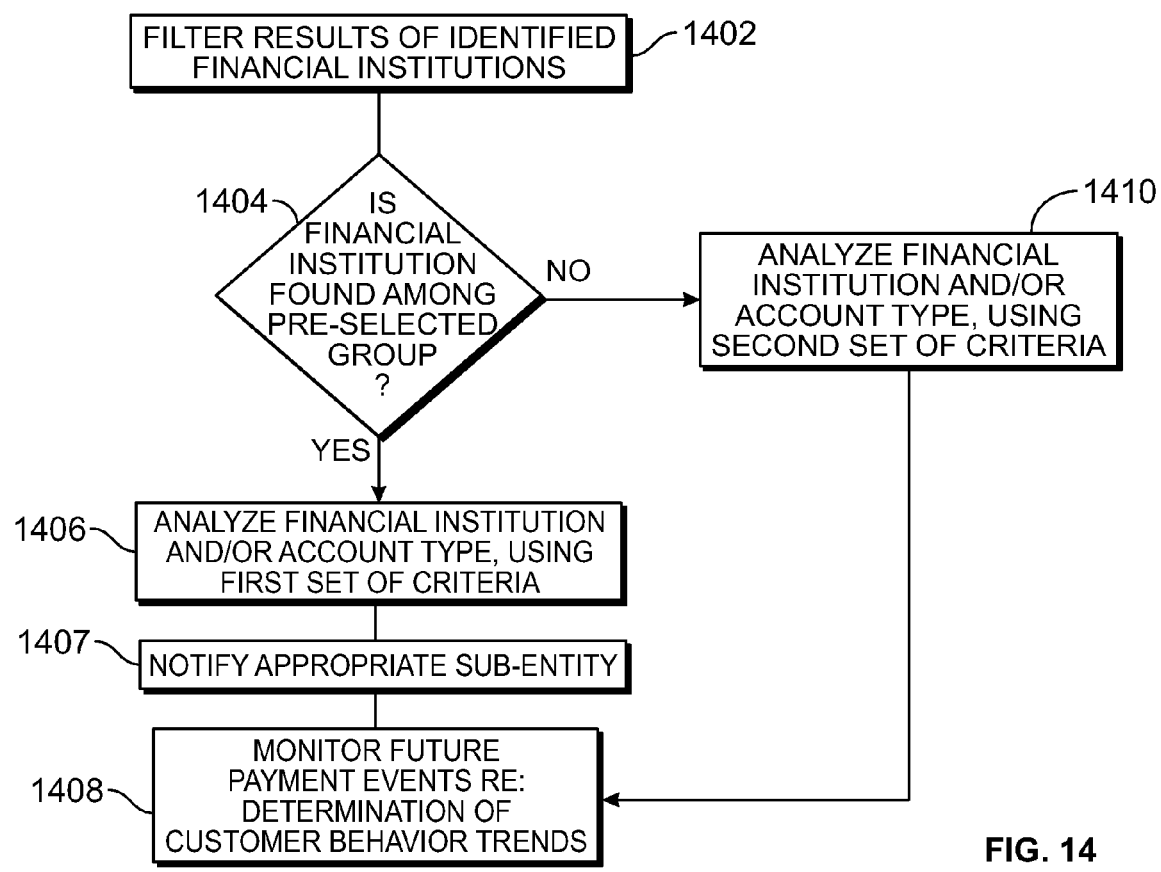
FIG. 14 shows an illustrative flow diagram of a process associated with filtering results of identified financial institutions, as identified, for example, in a process shown in FIG. 13.

FIG. 14 shows an illustrative flow diagram of a process associated with filtering results of identified financial institutions, as identified, for example, in a process shown in FIG. 13. Step 1402 shows filtering the results of identified financial institutions. Step 1404 queries, preferably as part of the filtering, whether the financial institution is belongs to a pre-selected group.

If the financial institution belongs to a pre-selected group, step 1406 shows analyzing the financial institution upon which the payment is drawn and/or the account type using a first set of criteria. Step 1407 shows notifying an appropriate sub-entity regarding the financial institution upon which the payment is drawn. Step 1408 shows monitoring future payment events regarding the determination of customer behavior trends regarding payment.

For example, the process may determine that the customer has been paying a brokerage account from a first financial institution that required no deposit amounts. The process may determine that the customer then changed to a branded credit card that requires one million dollars in deposit amounts and a ten thousand dollar annual fee.

The process may determine, based on the above-stated, exemplary, fact pattern, that the customer's economic situation has changed. In such a circumstance, the process may transmit all or part of the customer information a sub-entity of the financial institution to which the payment was made. The process may transmit all or part of the customer information to the marketing department of the financial institution that received the brokerage payment. Table 3 (below) shows a list of exemplary financial institution requirements.

TABLE 3

Exemplary Financial Institution Requirements

| Exemplary Requirements | Exemplary Values |
| --- | --- |
| Deposits at the Institution | Greater Than 1,000,000.00 USD |
| Monthly Spending | Greater Than 30,000 USD |
| Annual Fee | 10,000.00 USD |
| FICO Score | Greater Than 800 |
| Prior Relationship with Banking Institution | Greater Than Three Years |

If the financial institution does not belong to a pre-selected group, the process may analyze whether the financial institution upon which the payment is drawn satisfies a second set of criteria, as shown at step 1410. If the financial institution upon which the payment is drawn satisfies the criteria, the process may continue to monitor future payment events regarding the determination of customer payment behavior trends, as shown in 1408.

Steps 1408 may preferably increase or decrease the level of monitoring of the customer payment trends. For example, step 1408 may increase the monitoring period for a predetermined customer to once every six months as opposed to for every payment. Or, alternatively, step 1408, may decrease the monitoring period from once every six months to once every month. It should be noted that, in certain embodiments, such adjustments to the monitoring may also be in response to various account activity and not specifically only in response to a determination regarding the characteristics of the financial institution upon which the payment is drawn.

Certain embodiments of the invention may be directed to identifying and tracking the float associated with a predetermined payment. When a customer makes a payment using a paper coupon, makes a payment by on-line bill pay or makes a payment using any suitable payment mechanism such as bank by mail, bank by phone, a retail payment by some other method, or any suitable payment etc. (collectively, "a payment"), the actual transfer of funds associated with the payment may not take place immediately. Rather, the actual transfer of funds from the institution upon which the payment is drawn to the payee institution may take place after a certain amount of time has elapsed following the receipt by the payee institution.

For example, when a customer makes a mortgage payment using a payment coupon sent by regular mail, the payee institution may receive the check on a Monday (as shown in step 304 or 316 of FIG. 3 or, alternatively, step 604 of FIG. 6). At this point, the payee institution may process the check.

Processing the check may include capturing the identification information included on the check. Such identification information may include capturing various parameters associated with the check. Such parameters may include payor information, drawing institution information, amount information, date information, account number information, drawing institution logo information, etc. Following capture of one or more of the various parameters, the captured information may be used to clear the check—i.e., to request that the funds be transferred from the drawing financial institution to the payee financial institution.

Once the identification information included on the check has been captured, systems and methods according to the invention may include providing a more detailed status identifier to the customer. Such a status identifier may state— "payment received, payment being processed, funds not yet received from drawing institution."

This status identifier may indicate that the float is still located at the drawing institution. As such, the status identifier indicates that the drawing institution is still in control, and may therefore still be taking advantage, of the funds. Float 245 is indicated in FIG. 2B as being associated with capture of the information on the check, as shown at step 246.

Following clearing of the check—i.e., by transfer of the funds from the drawing institution to the payee institution— the status identifier may be updated to state "payment received, funds received from payee institution, funds not yet credited to customer account." At this point, the status identifier may indicate that float is located at the payee institution. As such, the status identifier indicates that the payee institution is in control, and may therefore be taking advantage, of the funds.

An additional status identifier may state "payment received, funds received from payee institution, funds credited to customer account." At this point, the customer's account has been credited with the funds and there is no additional float associated with the payment. In some embodiments, such more specific status identifier as described herein may preferably provide greater transparency to a financial institution customer's account and/or the customer's payments. Such greater transparency may preferably encourage greater transparency on the part of the drawing institution as well and can further enhance the ability of a customer to move funds at a lower cost to the customer.

FIG. 15A shows an illustrative flow chart relating to float determination and processing. Step 1502 shows a payee institution receiving a payment. Step 1504 shows the payee institution processing the payment. Such processing may include performing document capture on the payment check and payment coupon. Such processing may also include deriving a digital image from one or both of the check and the payment coupon.

Step 1506 shows the payee institution contacting the drawing institution on the check. At this point, schematic clock 1508 indicates that the float responsibility devolves on the drawing institution, according to pre-determined protocols—i.e., the drawing institution is now holding its customer's money following a point in time when the customer has authorized release of an amount of funds corresponding to the payment amount. As such, the drawing institution typically releases the customer's funds and, by so doing, discharges its responsibility to its customer. Should the drawing institution debit its customer's account, but not release the funds in a manner required by an interbank check-clearing protocol then the drawing institution has taken improper advantage of its customer's funds.

FIG. 15B shows an illustrative flow chart relating to float determination and processing for a payment request made through online bill pay, bank by phone, bank by mail or other suitable bill pay process. Step 1552 show receiving a bill pay request. Step 1554 shows generating a paper check in response to the request and transmitting the check.

Step 1556 shows transmitting to the requestor a check generation indicator indicating that the check for the amount of the request has been generated and transmitted. At this point, the funds preferably remain in the requestor's account as the funds have not yet been transferred from the financial institution upon whom the check is drawn to the payee.

Optional step 1558 describes an online portal displaying a balance associated with the requestor's account. Optional step 1558 also describes that the online portal may preferably display a provisional amount that reflects the amount of the check, or checks, that have been transmitted by online billpay, or the amount that will remain in the account after the check, or checks, that has been transmitted by online billpay clears.

Step 1560 shows that the process may transmit to the requestor, via a real-time notification channel, that funds corresponding to the request have been transferred to the payee, and removed from the requestor's account.

In any case, at step 1510 of FIG. 15A, the payee institution receives funds from the drawing institution. At this point, the float responsibility devolves on the payee institution. If the payee institution receives funds from the drawing institution but fails to allocate the funds, according to an appropriate protocol, to the customer's outstanding obligation, then the receiving institution has taken improper advantage of its customer's funds.

Thereafter, the payee institution credits payment to the customer's account and the transaction closes, as shown in step 1514 of FIG. 15A.

In certain embodiments, an assessment of fees may be provided. Another aspect of the embodiments is directed to identifying the specific moment in time, and/or a range of time, at which fees are assessed. In certain embodiments, systems and methods may track, and time stamp, when fees are assessed for failure to pay a payment.

Oftentimes payments are received after the due date but immediately before, substantially simultaneously thereto, or soon after assessment of fees. This aspect of the embodiments addresses the fact that a financial institution may compare the time at which the late fees are assessed to the time at which the payment was received. In circumstances where payments are received prior to assessment of fees, the financial institution may consider waiving the fee in view of the received, albeit late, payment.

If the payment was received after assessment of the predetermined fees, then the financial institution may elect to maintain the fee in view of the fact that the late payment was received after the assessment of the fee.

Figure 16:
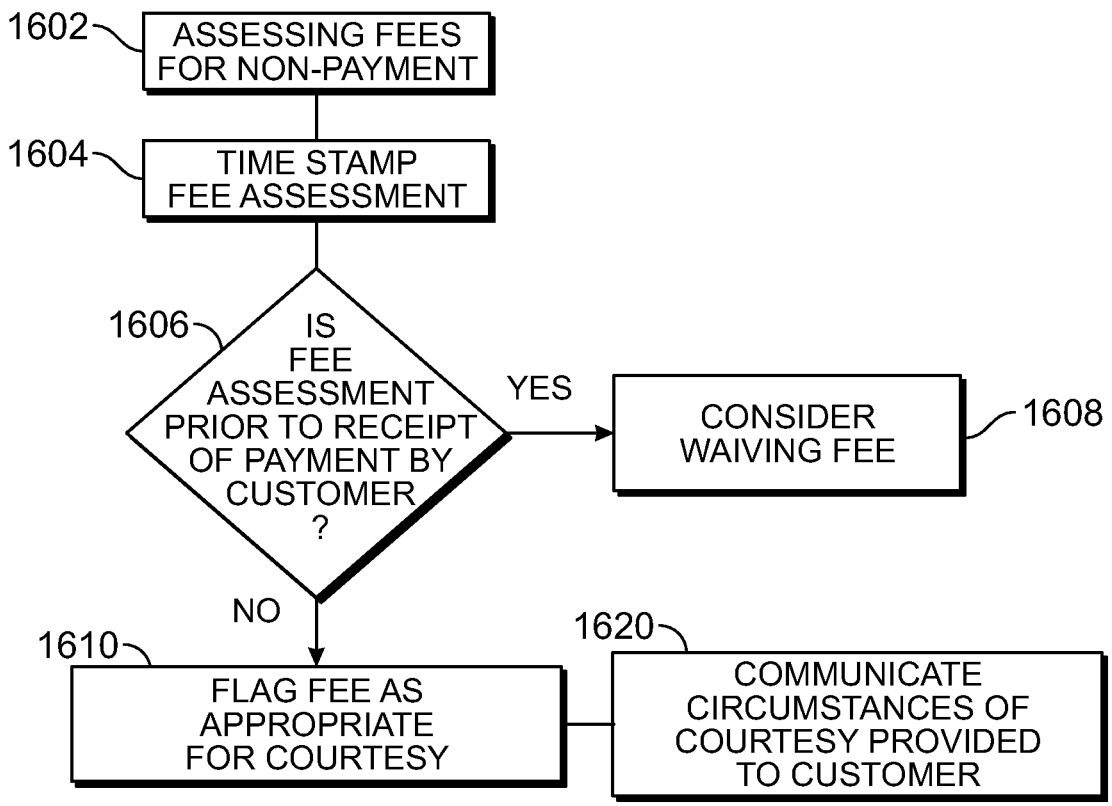
FIG. 16 shows an illustrative flow diagram of a process for considering fee assessment with respect to a received payment.

FIG. 16 shows an illustrative flow chart involving access to payment and assigning fees.

Step 1602 shows a financial institution assessing fees associated with non-payment for an outstanding obligation. Step 1604 shows time stamping the fee assessment in order to record when the fees were assessed.

Step 1606 shows querying whether a fee assessment occurred prior to the receipt of a payment by a customer. If the fee assessment occurred prior to receipt of payment, based on the time stamp associated with the fee assessment and the log in time of the payment, then step 1608 shows that the receiving institution may consider waiving the fee, but does not have to waive the fee, in view of the circumstances.

If the fee assessment occurred prior to receipt of payment, then step 1610 shows flagging the fee as appropriate for courtesy. Courtesy may include waiver of the fee. Step 1612 shows that, following the waiving of the fee, the receiving institution may communicate the circumstances of the provided courtesy to the customer, preferably prior to customer contact regarding assessment of the fee.

In certain embodiments, systems and methods may preferably monitor and track certain categories of account irregularities. Such tracking may preferably include detecting trends of failed transactions.

For example, systems and methods may preferably monitor customer accounts for double payment of identical amounts. Preferably, these systems and methods may include an algorithm for monitoring a customer account or accounts for double payments. A first input to such an algorithm may monitor for the occurrence, or rate of occurrence, of identical payments—i.e., payments of exactly the same amount.

Upon detection of identical payments, systems and methods may further determine whether the identical payments were made to the same payee. If the identical payments were made to the same payee, systems and methods may further determine whether the identical payments occurred within a predetermined period of time. If the identical payments occurred within a predetermined period of time, systems and methods may alert the customer that two identical transactions associated with the same payee have occurred within a predetermined window of time on the customer's account.

In certain embodiments, the notification to the customer may be sent in the form of an electronic communication such as an e-mail, a text, a recorded telephone message or other suitable electronic communication.

In certain embodiments the notification to the customer may prompt the customer to acknowledge the notification.

It should be noted that the systems and methods may be configured to notify the customer of all identical payments made in a predetermined window of time or in any suitable circumstance.

In certain embodiments, detection of identical payments, and subsequent notification to the customer, may occur independently of whether the payments were made to a single payee. In certain embodiments, detection of identical payments, and subsequent notification to the customer, may occur independently of whether the payments occurred within a predetermined period of time.

In certain embodiments, systems and methods may monitor several customer accounts for the occurrence of identical payments. For example, a questionable payee may devise a scheme to charge multiple customers a single, identical, amount. Such identical charges would preferably be identified by the systems and methods.

Following identification, systems and methods may preferably investigate the identical transactions further to determine whether the identical payments are indeed unwarranted. For example, systems and methods may obtain information regarding the Merchant Category Code ("MCC") of the payee and the identical transactions. Upon receiving information regarding the MCC, systems and methods may further determine, based on information regarding the MCC, whether identical transactions for payees associated with a first MCC are common. For example, a supermarket may rarely charge identical amounts because of the large diversity of products, where as an online magazine subscription retailer may often charge identical amounts because the retailer's selection of goods is limited.

If the MCC is associated with a vendor that typically charges identical charges, the identical transactions may be disregarded. If not, then systems and methods may further investigate the identical payments that occurred across several payees.

It should be noted that the above-described embodiments associated with determination and transparency of float calculations may preferably be used in conjunction with any of the other embodiments of this application. In fact, all of the embodiments described herein, for all aspects of the embodiments, may be used in conjunction with one or more of the other embodiments, or with one or more features of embodiments, described herein.

Accordingly, and in with the embodiments described above regarding real-time notification channel, the customer may, either based on a pre-determined setting, or in response to a customer request, be informed as to whether his payment was "timely received." In addition, a customer may be informed as to whether his payment was "timely paid." A customer may be informed as to the "amount paid."

Thus, methods and apparatus for unified incoming communication pathway processing in accordance with the systems and methods of the invention have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. An article of manufacture comprising a non-transitory computer usable medium having computer readable program code embodied therein, the code when executed by a processor causes a computer associated with a financial institution to electronically notify an individual of a received correspondence item, and to provide payment status indication in response, at least in part, to the received correspondence item, the computer readable program code in said article comprising:

computer readable program code for causing the computer to receive a paper correspondence item;

computer readable program code for causing the computer to derive a digital image from the correspondence item;

computer readable program code for causing the computer to identify, based on the derived digital image, whether the correspondence item is classified as one of a deposit, a payment or a legal order processing document, and to identify, based on the derived digital image of the correspondence item, the individual associated with the correspondence item;

computer readable program code for causing the computer to, in response to the classification of the correspondence item as one of a deposit, a payment or a legal order processing document, route the correspondence item to a sub-entity of the financial institution, said sub-entity being associated with a classification associated with the correspondence item; and computer readable program code for causing the computer to use a real-time notification channel to notify the individual of receipt of the correspondence item based, at least in part, on the identification of the individual and on a communication protocol associated with the sub-entity;

computer readable program code for causing the computer to use the real-time notification channel to transmit to the individual a payment status indicator, said payment status indicator selected from a group consisting of "timely received," "timely paid" and "amount paid;"

wherein the real-time notification channel is a system-set notification channel, and wherein the real-time notification channel is selected in response to a determination of the channel corresponding to the greatest magnitude of receipt confirmations received from the individual over a pre-determined number of previous receipt confirmations;

wherein, when the correspondence item is a payment, the status indicator "timely received" corresponds to a comparison of a ledger cutoff time to the due date for the payment; and computer readable code for causing the computer to notify, using an electronic communication channel, the sub-entity regarding an identity of a drawing institution associated with the payment, the notifying being based, at least in part, on the communication protocol associated with the sub-entity.

2. The article of claim 1 wherein the payment status indicator is selected from a group of payment status indicators, a plurality of constituents of the group that are based, at least in part, on the communication protocol associated with the sub-entity.

3. The article of claim 2 wherein the communication protocol associated with the sub-entity is configured to accept and allocate overpayment of an outstanding payment obligation, said allocation being made according to an overpayment allocation algorithm.

4. The article of claim 1 further comprising computer readable program code for causing, in response to a change in the status of the payment, the computer to use the real-time notification channel to transmit to the individual an updated payment status indicator.

5. The article of claim 1 further comprising computer readable program code for causing the computer to prompt a user to select a payment status indicator from among a list of payment status indicators.

6. Apparatus for electronically notifying an individual of the processing status of a received correspondence item, the apparatus comprising:

a receiver configured to receive a paper correspondence item and to derive a digital image therefrom;

a processor configured to determine, based on the derived digital image, whether the correspondence item is classified as one of a deposit, a payment or a legal order processing document;

the processor further configured to identify, based on the derived digital age, the individual associated with the correspondence item;

the processor being further configured to, in response to the determination of the classification of the correspondence item as one of the deposit, the payment or the legal order processing document, route the digital image of the correspondence item to a sub-entity of a financial institution, the sub-entity associated with the classification of the correspondence item;

the processor being further configured to use a real-time notification channel to notify the individual of receipt of the correspondence item, the notification being based, at least in part, on the identification of the individual and a communication protocol associated with the sub-entity of the financial institution;

the processor being further configured to use the real-time notification channel to transmit to the individual a payment status indicator, said payment status indicator selected from a group of payment status indicators, a plurality of constituents of the group that are based, at least in part, on the communication protocol associated with the sub-entity;

wherein the real-time notification channel is a system-set notification channel, and wherein the real-time notification channel is selected in response to a determination of the channel corresponding to the greatest magnitude of receipt confirmations received from the individual over a pre-determined number of previous receipt confirmations;

wherein, when the correspondence item is a payment, the status indicator "timely received" corresponds to a comparison of a ledger cutoff time to the due date for the payment wherein the ledger cutoff time corresponds to one of an ATM payment, a bank center payment, a vault payment and a bank by mail payment, and notifying, using an electronic communication channel, the sub-entity regarding an identity of a drawing institution associated with the payment, the notifying being based, at least in part, on the communication protocol associated with the sub-entity.

7. The apparatus of claim 6 wherein the payment status indicator is selected from a group of payment status indicators "timely received," "timely paid," "amount paid," "overpaid" and "underpaid".

8. The apparatus of claim 7 wherein the communication protocol associated with the sub-entity is configured to accept and allocate overpayment of an outstanding payment obligation, said allocation being made according to an overpayment allocation algorithm.

9. The apparatus of claim 6 wherein the processor is further configured to trigger a transmission of an updated payment status indicator in response to a change in the status of the payment.

10. The apparatus of claim 6 wherein the processor is further configured to prompt a user to select a payment status indicator from among a list of payment status indicators.

11. One or more non-transitory computer-readable media storing computer-executable instructions which, when executed by a processor on a computer system, perform a method for electronically notifying an individual of receipt of correspondence item from the individual, the method comprising:

using a receiver to receive a paper correspondence item and to derive a digital image therefrom;

using a processor configured to determine, based on the derived digital image, whether the correspondence item is classified as one of a deposit, a payment or a legal order processing document;

using the processor to identify, based on the derived digital image, the individual associated with the correspondence item;

in response to the determination of the classification of the correspondence item as one of a deposit, a payment or a legal order processing document, using the processor to route the digital image of the correspondence item to a sub-entity of a financial institution, the sub-entity associated with the correspondence item;

using the processor to notify, via a real-time notification channel, the individual of receipt of the correspondence item, the notification being based, at least in part, on the identification of the individual and a communication protocol associated with the sub-entity of the financial institution;

using the processor to transmit to the individual, via the real-time notification channel, a payment status indicator, said payment status indicator selected from a group of payment status indicators, a plurality of constituents of the group that are based, at least in part, on the communication protocol associated with the sub-entity;

wherein the real-time notification channel is a system-set notification channel, and wherein the real-time notification channel is selected in response to a determination of the channel corresponding to the greatest magnitude of receipt confirmations received from the individual over a pre-determined number of previous receipt confirmations;

wherein, when the correspondence item is a payment, the status indicator "timely received" corresponds to a comparison of a ledger cutoff time to the due date for the payment wherein the ledger cutoff time corresponds to one of an ATM payment, a bank center payment, a vault deposit payment and a bank by mail payment, and using the processor to notify, using an electronic communication channel, the sub-entity regarding an identity of a drawing institution associated with the payment, the notifying being based, at least in part, on the communication protocol associated with the sub-entity.

12. The method of claim 11 wherein the payment status indicator is selected from a group of payment status indicators "timely received," "timely paid," "amount paid," "overpaid" and "underpaid".

13. The method of claim 12 wherein the communication protocol associated with the sub-entity is configured to accept and allocate overpayment of an outstanding payment obligation, said allocation being made according to an overpayment allocation algorithm.

14. The method of claim 11 further comprising using the processor to trigger transmission of an updated payment status indicator in response to a change in the status of the payment.

15. The method of claim 11 using the processor to prompt a user to select a payment status indicators from among a list of payment status indicators.

* * * * *